US009723611B2

(12) United States Patent
Seok

(10) Patent No.: US 9,723,611 B2
(45) Date of Patent: Aug. 1, 2017

(54) METHOD FOR SUPPORTING BASIC SERVICE SET IN WIRELESS LAN SYSTEM AND APPARATUS THEREFOR

(71) Applicant: LG Electronics Inc., Seoul (KR)

(72) Inventor: Yongho Seok, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 14/890,727

(22) PCT Filed: Nov. 11, 2013

(86) PCT No.: PCT/KR2013/010160
§ 371 (c)(1),
(2) Date: Nov. 12, 2015

(87) PCT Pub. No.: WO2014/185608
PCT Pub. Date: Nov. 20, 2014

(65) Prior Publication Data
US 2016/0105888 A1    Apr. 14, 2016

Related U.S. Application Data

(60) Provisional application No. 61/822,933, filed on May 14, 2013, provisional application No. 61/875,091, filed on Sep. 8, 2013.

(51) Int. Cl.
*H04W 16/10* (2009.01)
*H04W 88/08* (2009.01)
(Continued)

(52) U.S. Cl.
CPC ....... *H04W 72/0446* (2013.01); *H04W 16/10* (2013.01); *H04W 72/046* (2013.01); *H04W 84/12* (2013.01)

(58) Field of Classification Search
CPC ........... H04W 72/0446; H04W 72/046; H04W 16/10; H04W 84/12
See application file for complete search history.

(56) References Cited

U.S. PATENT DOCUMENTS

| | | | |
|---|---|---|---|
| 2007/0149230 A1* | 6/2007 | Song | H04W 72/02 |
| | | | 455/515 |
| 2011/0116401 A1 | 5/2011 | Banerjea et al. | |

(Continued)

FOREIGN PATENT DOCUMENTS

| | | |
|---|---|---|
| JP | 2013-534118 A | 8/2013 |
| JP | 2014-524209 A | 9/2014 |

(Continued)

OTHER PUBLICATIONS

M. Park, Intel: "Proposed Specification Framework for TGah", IEEE 802.11-11/1137r12, Nov. 15, 2012, XP055166824.

(Continued)

*Primary Examiner* — Andrew Lai
*Assistant Examiner* — Harry H Kim
(74) *Attorney, Agent, or Firm* — Dentons US LLP

(57) ABSTRACT

The present invention relates to a wireless communication system and more specifically, to a method for supporting a basic service set (BSS) in a wireless LAN system and an apparatus therefor. According to one embodiment of the present invention, a method for supporting a BSS by an access point (AP) in a wireless LAN system can comprise the steps of: scanning an overlapping BSS (OBSS); and selecting a primary channel for a new BSS of the AP from channels for which a beacon is not detected during the OBSS scanning. The primary channel can be selected from all channels except the secondary channel of the OBSS. In addition, if the new BSS supports an operating channel having a 4 MHz, 8 MHz or 16 MHz channel bandwidth, a (Continued)

primary channel having a 2 MHz channel bandwidth can be chosen for the new BSS.

11 Claims, 19 Drawing Sheets

(51) Int. Cl.
*H04W 72/04* (2009.01)
*H04W 84/12* (2009.01)

(56) References Cited

U.S. PATENT DOCUMENTS

| | | |
|---|---|---|
| 2011/0292919 A1 | 12/2011 | Trainin et al. |
| 2012/0026997 A1 | 2/2012 | Seok et al. |
| 2012/0327870 A1 | 12/2012 | Grandhi et al. |
| 2015/0359008 A1* | 12/2015 | Wang ................ H04W 74/004 370/330 |

FOREIGN PATENT DOCUMENTS

| | | |
|---|---|---|
| KR | 1020120093320 | 8/2012 |
| KR | 1020120097514 | 9/2012 |
| WO | 2012/006365 A1 | 1/2012 |
| WO | 2012124949 | 9/2012 |
| WO | 2013/009776 A2 | 1/2013 |
| WO | 2013022254 | 2/2013 |

OTHER PUBLICATIONS

Y. Liu et al.: "VHT BSS Channel Selection", IEEE 802.11-11/1433r0, Nov. 3, 2011, XP017673317.
M. Rison, CSR: "LB188 (D3.0) resolution for regulatory generalization", IEEE 802.11-12/1037r4, Sep. 19, 2012, XP068039692.
Kneckt, et al.: "Overlapping BSS Co-Existence", IEEE 802.11-10/1303r6, Nov. 11, 2010.

* cited by examiner

METHOD FOR SUPPORTING BASIC SERVICE SET IN WIRELESS LAN SYSTEM AND APPARATUS THEREFOR

This application is a 35 USC §371 National Stage entry of International Application No. PCT/KR2013/010160 filed on Nov. 11, 2013, and claims priority to U.S. Provisional Application Nos. 61/822,933 filed on May 14, 2013 and 61/875,091 filed on Sep. 8, 2013, all of which are hereby incorporated by reference in their entireties as if fully set forth herein.

TECHNICAL FIELD

The following description relates to a wireless communication system and, more particularly, to a method and apparatus supporting a basic service set in a Wireless Local Area Network (WLAN) system.

BACKGROUND ART

Various wireless communication technologies have been developed with rapid development of information technology. WLAN technology from among wireless communication technologies allows wireless Internet access at home, in enterprises or in a specific service provision region using mobile terminals, such as a Personal Digital Assistant (PDA), a laptop computer, a Portable Multimedia Player (PMP), etc. on the basis of Radio Frequency (RF) technology.

In order to overcome limited communication speed, one of the disadvantages of WLAN, recent technical standards have proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input Multiple Output (MIMO) technology has recently been applied to both a transmitter and a receiver so as to minimize transmission errors as well as to optimize a data transfer rate.

DISCLOSURE

Technical Problem

As next-generation communication technology, Machine-to-Machine (M2 M) communication is under discussion. In an IEEE 802.11 WLAN system as well, technical standards for supporting M2 M communication have been developed as IEEE 802.11ah. For M2 M communication, a scenario may be considered in which less data is transmitted and received at a low speed in an environment in which many devices are present.

An object of the present invention is to provide a method supporting a Basic Service Set (BSS) operating in a band of 1 GHz or below.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for supporting a Basic Service Set (BSS) by an Access Point (AP) in a wireless local area network system, including scanning an overlapping BSS (OBSS); and selecting a primary channel for a new BSS of the AP from among channels on which no beacons are detected during an OBSS scan, wherein the primary channel is selected from among channels except for a secondary channel of the OBSS, and if the new BSS supports an operating channel having a width of 4 MHz, 8 MHz, or 16 MHz, a primary channel having a width of 2 MHz for the new BSS is selected.

In another aspect of the present invention, provided herein is an Access Point (AP) for supporting a Basic Service Set (BSS) in a wireless local area network system, including a transceiver; and a processor, wherein the processor is configured to scan an Overlapping BSS (OBSS) and to select a primary channel for a new BSS of the AP from among channels on which no beacons are detected during an OBSS scan, the primary channel is selected from among channels except for a secondary channel of the OBSS, and if the new BSS supports an operating channel having a width of 4 MHz, 8 MHz, or 16 MHz, a primary channel having a width of 2 MHz for the new BSS is selected.

In the above aspects of the present invention, the following may be commonly applied.

The OBSS may support the operating channel having a width of 4 MHz, 8 MHz, or 16 MHz, and the primary channel of the new BSS may be selected from among channels except for a secondary channel having a width of 2 MHz of the OBSS.

The OBSS may support an operating channel having a width of 16 MHz, and the primary channel of the new BSS may be selected from channels except for a secondary channel having a width of 4 MHz of the OBSS.

If the new BSS supports an operating channel having a width of 2 MHz, 4 MHz, 8 MHz, or 16 MHz, a primary channel having a width of 1 MHz for the new BSS may be selected.

The OBSS may support the operating channel having a width of 2 MHz, 4 MHz, 8 MHz, or 16 MHz, and the primary channel of the new BSS may be selected from channels except for a secondary channel having a width of 1 MHz of the OBSS.

The AP may transmit a beacon including an operation element including a channel width field.

If the zeroth bit (B0), first bit (B1), second bit (B2), third bit (B3), and fourth bit (B4) of the channel width field are set to 01000, the channel width field may indicate that the primary channel has a width of 2 MHz and the new BSS supports an operating channel having a width of 2 MHz. If B0, B1, B2, B3, and B4 of the channel width field are set to 01100, the channel width field may indicate that the primary channel has a width of 2 MHz and the new BSS supports an operating channel having a width of 4 MHz. If B0, B1, B2, B3, and B4 of the channel width field are set to 01110, the channel width field may indicate that the primary channel has a width of 2 MHz and the new BSS supports an operating channel having a width of 8 MHz. If B0, B1, B2, B3, and B4 of the channel width field are set to 01111, the channel width field may indicate that the primary channel has a width of 2 MHz and the new BSS supports an operating channel having a width of 16 MHz.

If B0, B1, B2, B3, and B4 of the channel width field are set to 10000, the channel width field may indicate that the primary channel has a width of 1 MHz and the new BSS supports an operating channel having a width of 1 MHz. If B0, B1, B2, B3, and B4 of the channel width field are set to 11000, the channel width field may indicate that the primary channel has a width of 1 MHz and the new BSS supports an operating channel having a width of 2 MHz. If B0, B1, B2, B3, and B4 of the channel width field are set to 11100, the channel width field may indicate that the primary channel has a width of 1 MHz and the new BSS supports an operating channel having a width of 4 MHz. If B0, B1, B2, B3, and B4 of the channel width field are set to 11110, the channel width field may indicate that the primary channel has a width of 1 MHz and the new BSS supports an operating channel having a width of 8 MHz. If B0, B1, B2, B3, and B4 of the channel width field are set to 11111, the channel width field may indicate that the primary channel has a width of 1 MHz and the new BSS supports an operating channel having a width of 16 MHz.

The AP may provide an Enhanced Distributed Channel Access (EDCA) parameter set to a station (STA) and the EDCA parameter may be applied to a backoff procedure of the STA. For transmission of a data unit having a channel width of 1 MHz, a first backoff procedure of the STA may be allowed on a primary channel having a width of 1 MHz, and if a Transmission Opportunity (TXOP) is given as a result of the primary backoff procedure, only transmission of a data unit having a channel width of 1 MHz may be allowed and transmission of a data unit having a channel width greater than 1 MHz may not be allowed. For transmission of a data unit having a channel width of 2 MHz or above, a second backoff procedure of the STA may be allowed on a primary channel having a width of 2 MHz, and if the TXOP is given as a result of the secondary backoff procedure, transmission of a data unit having a channel width of 2 MHz or above may be allowed.

The new BSS may operate in a band of 1 GHz or below (sub 1 GHz).

The foregoing comprehensive description and following detailed description of the present invention are exemplary and given for additional description of the invention as described in the appended claims.

Advantageous Effects

According to the present invention, a method and apparatus supporting a Basic Service Set (BSS) operating in a band of 1 GHz or below.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
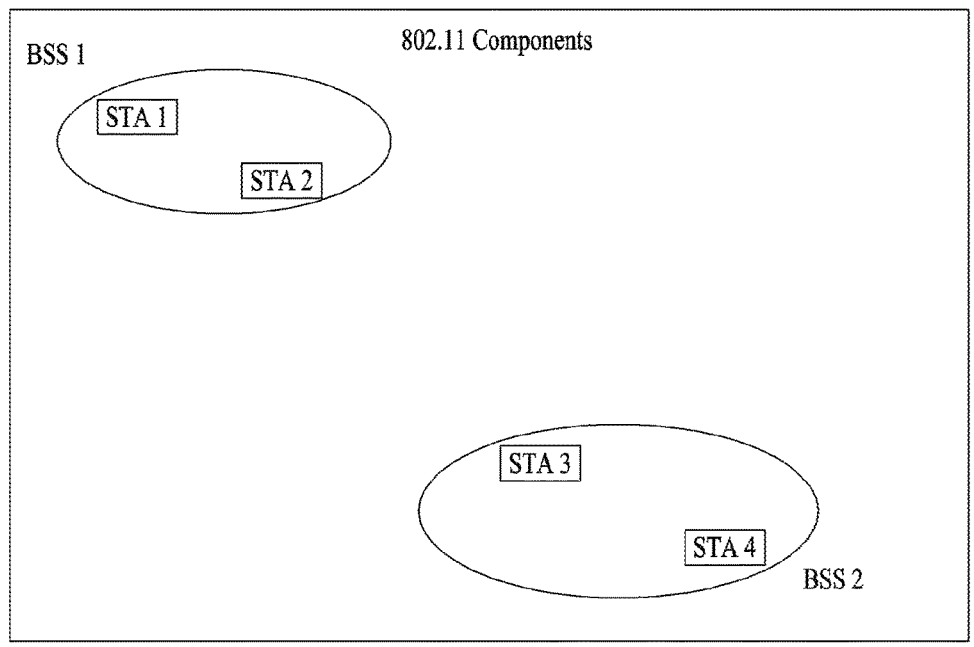
FIG. 1 is a diagram illustrating an exemplary structure of an IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3 GPP) system, a 3 GPP Long Term Evolution (LTE) system, an LTE-Advanced (LTE-A) system, and a 3 GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
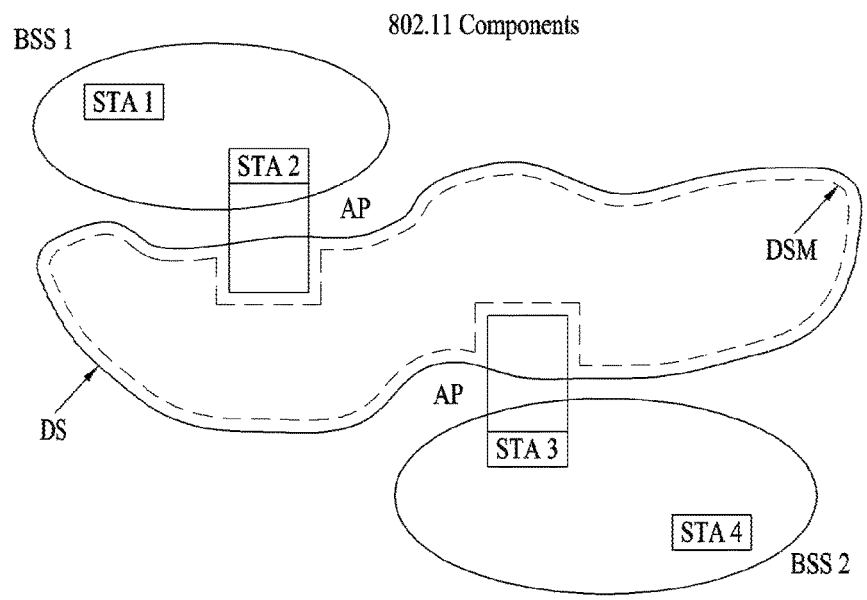
FIG. 2 is a diagram illustrating another exemplary structure of an IEEE 802.11 system to which the present invention is applicable.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by Physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
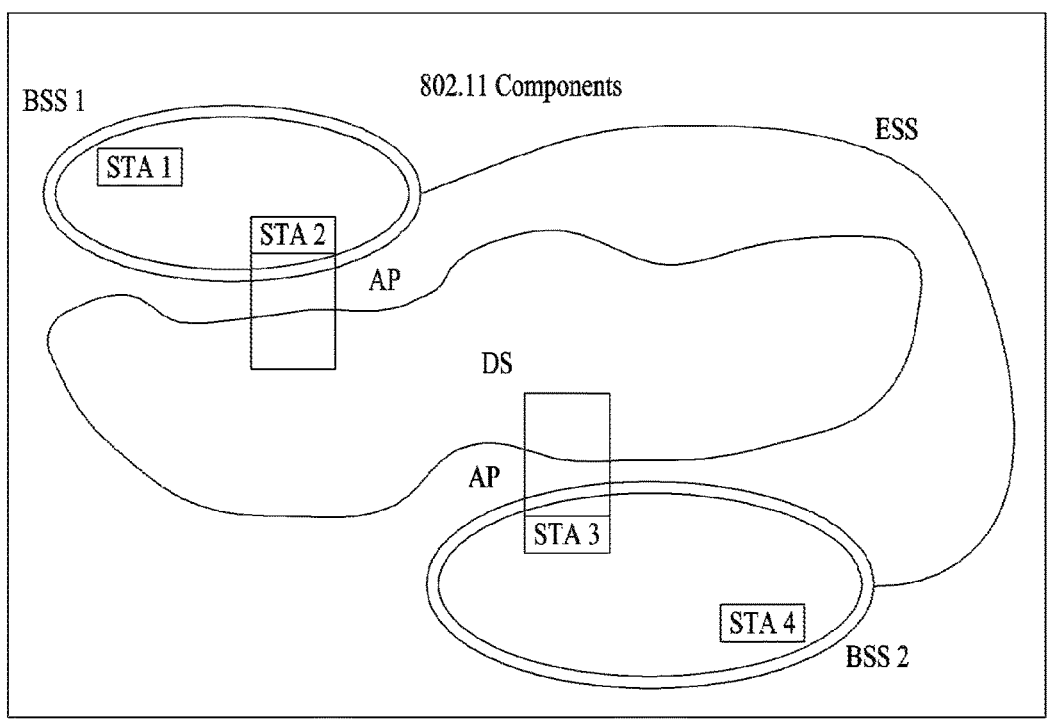
FIG. 3 is a diagram illustrating still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
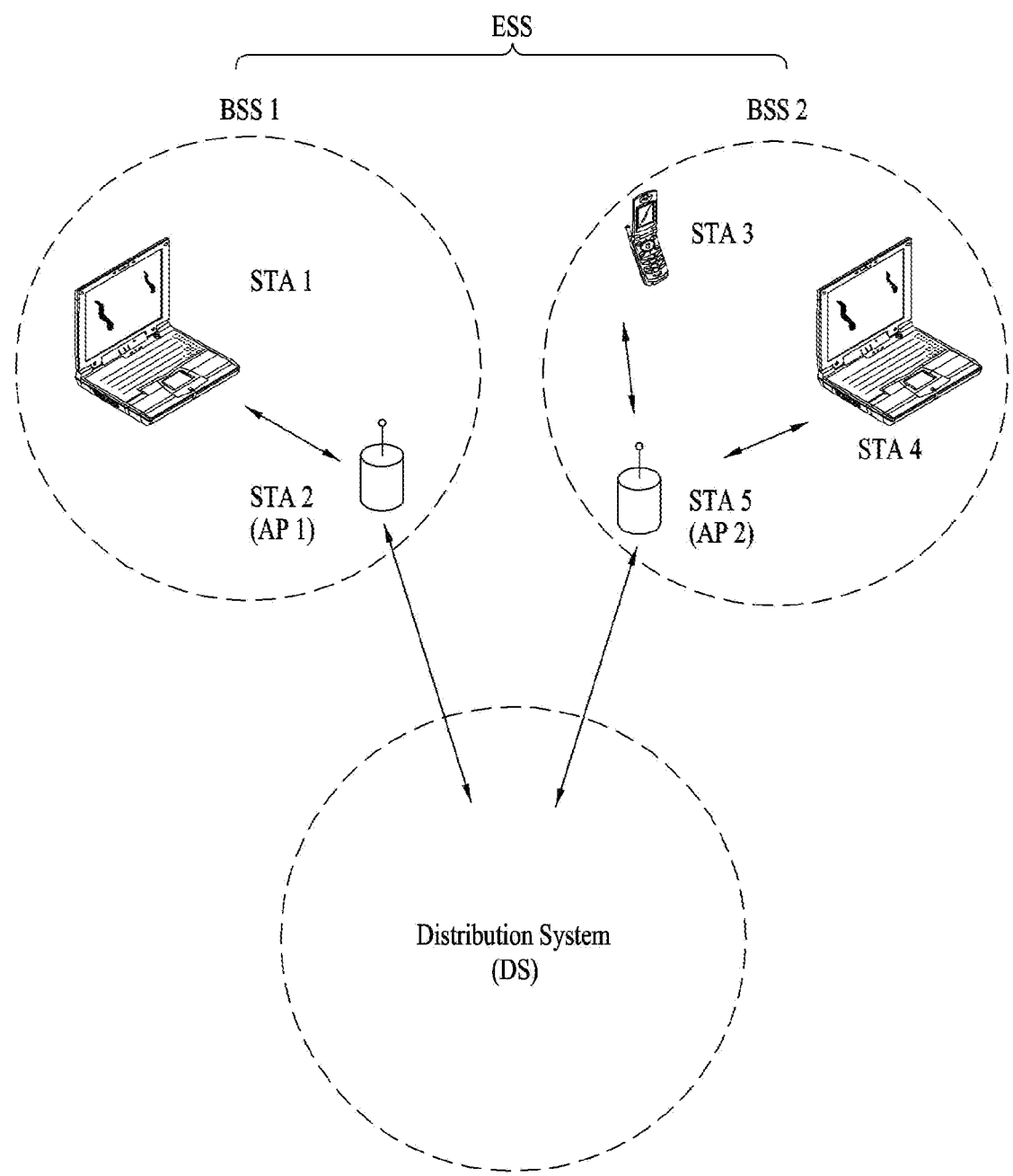
FIG. 4 is a diagram illustrating an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Layer Architecture

In the WLAN system, an operation of an AP and/or an STA may be described from the perspective of layer architecture. Layer architecture in terms of device configuration may be implemented by a processor. The AP or the STA may have a plurality of layer structures. For example, the 802.11 standard specifications mainly deal with the Medium Access Control (MAC) sublayer of the Data Link Layer (DLL) and the PHY layer. The PHY layer may include a Physical Layer Convergence Protocol (PLCP) entity and a Physical Medium Dependent (PMD) entity. Both the MAC sublayer and the PHY layer conceptually include management entities, called MAC Sublayer Management Entity (MLME) and PHY Layer Management Entity (PLME). These entities provide layer management service interfaces through which layer management functions may be invoked.

In order to provide a correct MAC operation, a Station Management Entity (SME) is present within each AP/STA. The SME is a layer-independent entity that may be viewed as residing in a separate management plane or as residing off to the side. The exact functions of the SME are not specified herein, but in general this entity may be viewed as being responsible for such functions as gathering of information about layer-dependent statuses from various Layer Management Entities (LMEs) and similarly setting of the values of layer-specific parameters. The SME may typically perform such functions on behalf of general system management entities and may implement standard management protocols.

The foregoing entities interact in various ways. For example, the entities may interact with each other by exchanging GET/SET primitives. An XX-GET.request primitive is used to request the value of a given MIB attribute (management information-based attribute information). An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

The MLME and the SME may exchange various MLME_GET/SET primitives via an MLME_SAP (Service Access Point). Also, various PLMEM_GET/SET primitives may be exchanged between the PLME and the SME via a PLME_SAP and between the MLME and the PLME via an MLME-PLME_SAP.

Link Setup Process

Figure 5:
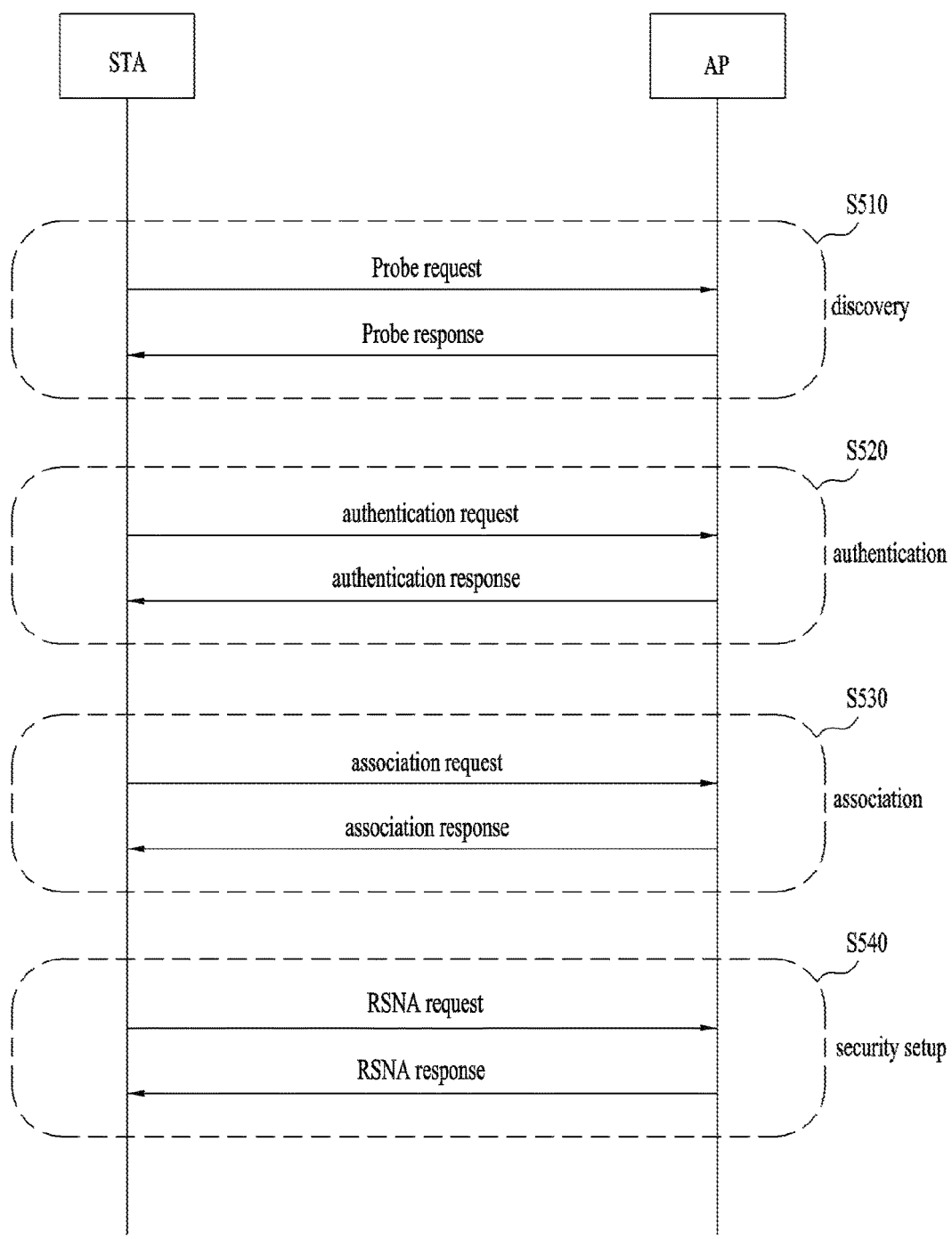
FIG. 5 is a diagram for explaining a link setup process in a WLAN system.

FIG. 5 is a flowchart illustrating a general link setup process.

In order to allow an STA to set up a link with a network and transmit/receive data to/from the network, the STA should perform network discovery, authentication, association, and authentication for security. The link setup process may also be referred to as a session initiation process or a session setup process. In addition, discovery, authentication, association, and security setup steps of the link setup process may be generically referred to as an association process.

An exemplary link setup process will be described with reference to FIG. 5.

In step S510, the STA may perform network discovery. The network discovery may include scanning of the STA. That is, the STA should search for an available network so as to access the network. The STA should identify a compatible network before joining in a wireless network. The process for identifying a network in a specific region is referred to as scanning.

Scanning is classified into active scanning and passive scanning.

FIG. 5 illustrates a network discovery operation including active scanning. In the case of active scanning, the STA transmits a probe request frame and waits for a response to the probe request frame, while changing channels in order to determine an AP present around the STA. A responder transmits a probe response frame as a response to the probe request frame to the STA that has transmitted the probe request frame. The responder may be an STA that has finally transmitted a beacon frame in a BSS of the scanned channel. In a BSS, since an AP transmits a beacon frame, the AP is a responder. In a BSS, since STAs of the IBSS sequentially transmit beacon frames, the responder is not constant. For example, the STA, which has transmitted a probe request frame on Channel #1 and has received a probe response frame on Channel #1, may store BSS-related information included in the received probe response frame, move to the next channel (for example, Channel #2), and perform scanning on the next channel in the same manner (i.e., probe request/response transmission/reception on Channel #2).

Although not illustrated in FIG. 5, the scan operation may also be carried out by passive scanning. An STA that performs passive scanning waits for a beacon frame, while moving from one channel to another channel. The beacon frame is one of management frames in IEEE 802.11, indicates the presence of a wireless network, enables the STA performing scanning to search for the wireless network, and is periodically transmitted in such a manner that the STA may join in the wireless network. In a BSS, an AP periodically transmits a beacon frame. In an IBSS, STAs of the IBSS sequentially transmit beacon frames. Upon receipt of a beacon frame during scanning, an STA stores BSS information included in the beacon frame, moves to another channel, and records beacon frame information for each channel. Upon receipt of a beacon frame, an STA stores BSS-related information included in the received beacon frame, moves to the next channel, and performs scanning on the next channel in the same manner.

In comparison between active scanning and passive scanning, active scanning advantageously has a shorter delay and less power consumption than passive scanning.

After the STA discovers the network, the STA may perform an authentication process in step S520. The authentication process may be referred to as a first authentication process to clearly distinguish the authentication process from a security setup process of step S540.

The authentication process may include transmission of an authentication request frame to an AP by the STA, and transmission of an authentication response frame to the STA by the AP in response to the authentication request frame. The authentication frame used for an authentication request/response may be a management frame.

An authentication frame may include an authentication algorithm number, an authentication transaction sequence number, a status code, challenge text, a Robust Security Network (RSN), a Finite Cyclic Group (FCG), etc. The above-mentioned information included in the authentication request/response frame may be an example of part of information that may be included in the authentication request/response frame, may be replaced with other information, or may include additional information.

The STA may transmit the authentication request frame to the AP. The AP may determine whether to authenticate the STA based on information included in the received authentication request frame. The AP may provide the result of the authentication process to the STA in the authentication response frame.

After the STA is successfully authenticated, the association process may be carried out in step S530. The association process may involve transmitting an association request frame to the AP by the STA, and transmitting an association response frame to the STA by the AP in response to the association request frame.

For example, the association request frame may include information related to various capabilities, a beacon listen interval, a Service Set Identifier (SSID), supported rates, supported channels, an RSN, a mobility domain, supported operating classes, a Traffic Indication Map (TIM) broadcast request, interworking service capability, etc.

For example, the association response frame may include information related to various capabilities, a status code, an Association ID (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information may be an example of part of information that may be included in the association request/response frame, may be replaced with other information, or may include additional information.

After the STA is successfully associated with the network, a security setup process may be carried out in step S540. The security setup process of step S540 may be referred to as an authentication process based on a Robust Security Network Association (RSNA) request/response. The authentication process of step S520 may be referred to as the first authentication process, and the security setup process of step S540 may also be simply referred to as an authentication process.

For example, the security setup process of step S540 may include a private key setup process through 4-way handshaking based on an (Extensible Authentication Protocol over LAN (EAPOL) frame. In addition, the security setup process may also be carried out in a security scheme that has not been defined in the IEEE 802.11 standards.

WLAN Evolution

In order to overcome limitations in WLAN communication speed, IEEE 802.11n has recently been established as a technology standard. IEEE 802.11n aims to increase network speed and reliability and extend the coverage of the wireless network. More specifically, IEEE 802.11n supports a High Throughput (HT) of up to 540 Mbps and is based on Multiple Input Multiple Output (MIMO) using multiple antennas at both a transmitter and a receiver in order to minimize transmission errors and optimize data rates.

With the widespread use of WLAN technology and diversification of WLAN applications, there is a need to develop a new WLAN system capable of supporting a higher throughput than a data processing speed supported by IEEE 802.11n. A next-generation WLAN system supporting Very High Throughput (VHT) is the next version (i.e., IEEE 802.11ac) of the IEEE 802.11n WLAN system, and is one of IEEE 802.11 WLAN systems recently proposed to support a data process speed of 1 Gbps or more at a MAC Service Access Point (SAP).

In order to efficiently utilize a radio channel, the next-generation WLAN system supports Multi-User Multiple Input Multiple Output (MU-MIMO) transmission in which a plurality of STAs may simultaneously access a channel. In MU-MIMO transmission, the AP may simultaneously transmit a packet to at least one MIMO-paired STA.

In addition, supporting of WLAN system operations in whitespace is under discussion. For example, the introduction of the WLAN system in whitespace (TV WS) such as a frequency band (for example, ranging from 54 MHz to 698 MHz) because that becomes idle due to the transition from analog TV to digital TV has been discussed as the IEEE 802.11af standard. However, this is purely exemplary and the whitespace may be a licensed band that a licensed user may primarily use. The licensed user may be a user who has authority to use the licensed band, and may also be referred to as a licensed device, a primary user, an incumbent user, or the like.

For example, an AP and/or STA operating in the WhiteSpace (WS) should provide a function for protecting the licensed user. For example, if the licensed user such as a microphone has already used a specific WS channel that is a frequency band regulated to have a specific bandwidth in the WS band, the AP and/or STA may not use the frequency band corresponding to the WS channel so as to protect the licensed user. In addition, the AP and/or STA should discontinue using the frequency band, if the licensed user uses a frequency band used for transmission and/or reception of a current frame.

Therefore, the AP and/or STA should determine whether a specific frequency band of the WS band is available. In other words, the AP and/or STA should determine the presence or absence of a licensed user in the frequency band. Determination as to the presence or absence of the licensed user in a specific frequency band is referred to as spectrum sensing. An energy detection scheme, a signature detection scheme, and the like are used as the spectrum sensing mechanism. If the strength of a received signal is equal to or larger than a predetermined vale, the AP and/or STA may determine that the frequency band is being used by a licensed user. If a DTV preamble is detected, the AP and/or STA may determine that the frequency band is being used by a licensed user.

Machine to Machine (M2M) communication is under discussion as a next-generation communication technology. A technical standard for supporting M2M communication has been developed as IEEE 802.11ah in the IEEE 802.11 WLAN system. M2M communication refers to a communication scheme involving one or more machines, or is also be referred to as Machine Type Communication (MTC) or Device to Device (D2D) communication. A machine refers to an entity that does not require direct handling and intervention of a user. For example, not only a meter or automatic vending machine equipped with an RF module, but also a User Equipment (UE) such as a smartphone capable of performing communication by automatically accessing the network without user intervention/handling may be an example of such machines. M2M communication may include D2D communication and communication between a device and an application server, etc. As exemplary communication between a device and an application server, communication between a vending machine and an application server, communication between a Point of Sale (POS) device and an application server, and communication between an electric meter, a gas meter or a water meter and an application server. M2M-based communication applications may include security, transportation, healthcare, etc. Considering the above-mentioned application examples, M2M communication should be able to support intermittent transmission/reception of a small amount of data at low speed under an environment including a large number of devices.

Specifically, M2M communication should be able to support a large number of STAs. Although the current WLAN system is based on the assumption that one AP is associated with up to 2007 STAs, various methods for supporting association of many more STAs (e.g., about 6000 STAs) with one AP have recently been discussed for M2M communication. In addition, it is expected that many applications supporting/requesting a low transmission rate are present in M2M communication. In order to smoothly support this, an STA may recognize the presence or absence of data to be transmitted to the STA based on a Traffic Indication Map (TIM) element in the WLAN system, and various methods for reducing the bitmap size of the TIM have recently been discussed. In addition, it is expected that there will exists traffic data having a very long transmission/reception interval in M2M communication. For example, a very small amount of data such as the amount of used electricity/gas/water needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, the WLAN technology has been rapidly evolving, and not only the above-mentioned exemplary technologies but also other technologies such as a direct link setup, improvement of media streaming throughput, support of high-speed and/or large-scale initial session setup, and support of an extended bandwidth and operation frequency, are under development.

Medium Access Mechanism

In the IEEE 802.11 WLAN system, a basic MAC access mechanism is Carrier Sense Multiple Access with Collision Avoidance (CSMA/CA). The CSMA/CA mechanism is referred to as a Distributed Coordination Function (DCF) of IEEE 802.11 MAC, and basically includes a "Listen Before Talk" access mechanism. According to the above-mentioned access mechanism, an AP and/or an STA may perform Clear Channel Assessment (CCA) for sensing an RF channel or medium during a predetermined time interval (for example, DCF Inter-Frame Space (DIFS)), prior to data transmission. If it is determined that the medium is in an idle state, the AP and/or the STA starts frame transmission through the medium. On the other hand, if the AP and/or the STA senses the medium as occupied, the AP and/or the STA does not start its own transmission, sets a delay time (for example, a random backoff period) for medium access, and attempts to start frame transmission after waiting for the delay time. It is expected that multiple STAs will attempt to start frame transmission after waiting for different times by applying random backoff periods, thereby minimize collision.

In addition, the IEEE 802.11 MAC protocol provides a Hybrid Coordination Function (HCF). The HCF is based on a DCF and a Point Coordination Function (PCF). The PCF refers to a polling-based synchronous access scheme in which periodic polling is executed in such a manner that all receiving APs and/or STAs may receive data frames. In addition, the HCF includes Enhanced Distributed Channel Access (EDCA) and HCF Controlled Channel Access (HCCA). In EDCA, access is performed based on contention to provide a data frame to a plurality of users by a provider, whereas in HCCA, a contention-free-based channel access scheme based on a polling mechanism is used. In addition, the HCF includes a medium access mechanism for improving Quality of Service (QoS) of WLAN, and may transmit QoS data during both a Contention Period (CP) and a Contention Free Period (CFP).

Figure 6:
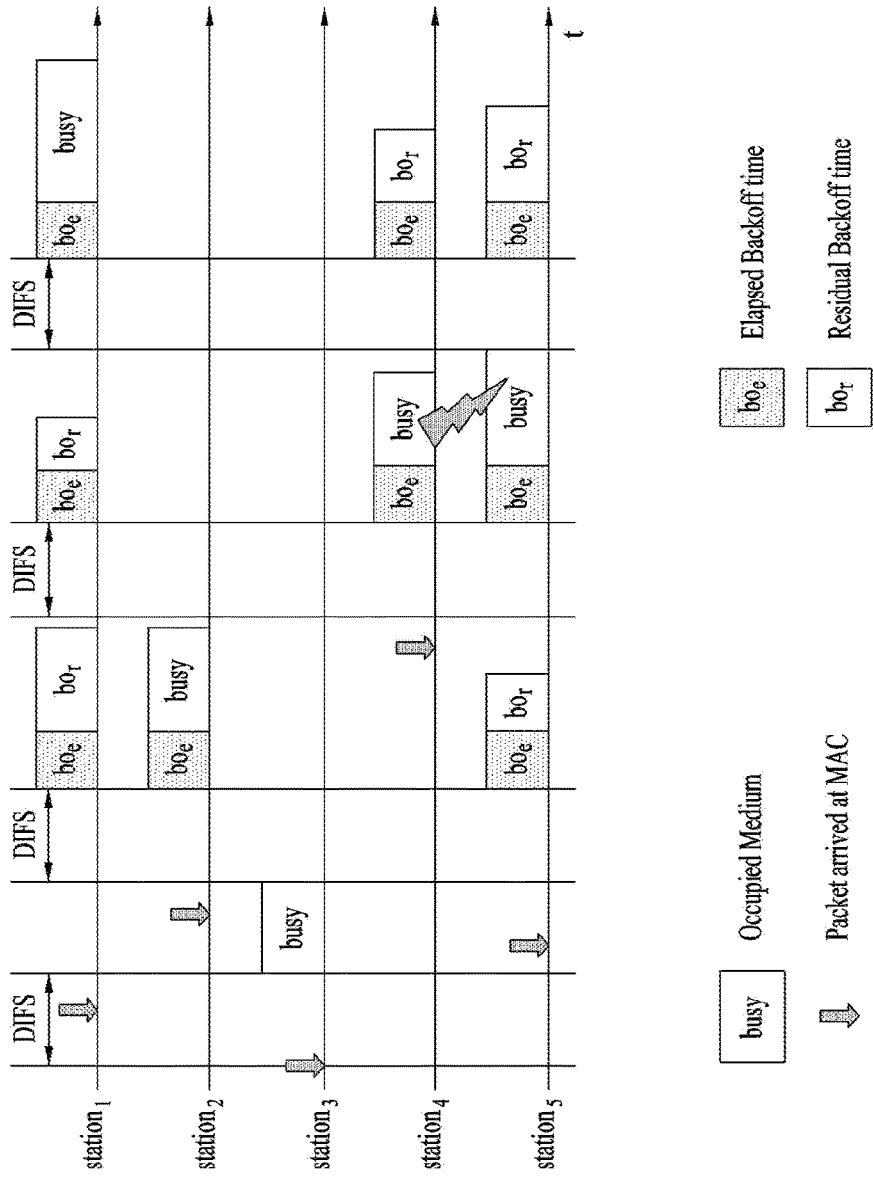
FIG. 6 is a diagram for explaining a backoff process.

FIG. 6 is a view referred to describing a backoff process.

An operations based on a random backoff period will be described with reference to FIG. 6. If an occupied or busy medium gets idle, a plurality of STAs may attempt to transmit data (or frames). As a method for minimizing collision, each STA may select a random backoff count, wait for a slot time corresponding to the selected backoff count, and then attempt to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which an ACK is not received for the transmission frame). If the CW parameter value reaches CWmax, data transmission may be attempted, maintaining CWmax until data transmission is successful. If the data transmission is successful, the CW parameter value is reset to CWmin. Preferably, CW, CWmin, and CWmax are set to $2n-1$ (where n=0, 1, 2, ...).

Once the random backoff process starts, the STA continuously monitors the medium while counting down the backoff slot according to the determined backoff count value. If the medium is monitored as occupied, the STA discontinues the count-down and waits for a predetermined time. If the medium gets idle, the STA resumes the count-down of the remaining slot time.

In the example of FIG. 6, if a packet to be transmitted to the MAC of STA3 arrives at STA3, STA3 may determine that the medium is idle during a DIFS and immediately transmit a frame. In the meantime, the other STAs monitor the medium as busy and wait for a predetermined time. During the predetermined time, transmission data may be generated in each of STA1, STA2, and STA5. If the medium is monitored as idle, each STA may wait for a DIFS and then count down backoff slots according to a random backoff count value selected by the STA. In the example of FIG. 6, STA2 selects the lowest backoff count value and STA1 selects the highest backoff count value. That is, at the moment when STA2 finishes backoff counting and starts frame transmission, the residual backoff time of STA5 is shorter than the residual backoff time of STA1. Each of STA1 and STA5 temporarily stops countdown while STA2 occupies the medium, and waits for a predetermined time. If STA2 finishes occupying the medium and the medium re-enters the idle state, each of STA1 and STA5 waits for a predetermined time DIFS, and restarts backoff counting. That is, after the remaining backoff slots as long as the residual backoff time are counted down, frame transmission may be started. Since the residual backoff time of STA5 is shorter than that of STA1, STA5 starts frame transmission. Meanwhile, transmission data may be generated in STA4 while STA2 occupies the medium. In this case, if the medium is in the idle state, STA4 waits for a DIFS, performs countdown according to a random backoff count value selected by STA4, and then starts frame transmission. FIG. 6 exemplarily illustrates the case in which the residual backoff time of STA5 coincides with the random backoff count value of STA4. In this case, an unexpected collision may occur between STA4 and STA5. If the collision occurs between STA4 and STA5, each of STA4 and STA5 does not receive an ACK, resulting in failure of data transmission. In this case, each of STA4 and STA5 may double the CW value, select a random backoff count value, and then perform countdown. Meanwhile, STA1 waits for a predetermined time due to transmission of STA4 and STA5 while the medium is in the occupied state. In this case, if the medium is in the idle state, STA1 waits for the DIFS, and then starts frame transmission after lapse of the residual backoff time.

Sensing Operation of STA

As described above, the CSMA/CA mechanism includes not only a physical carrier sensing mechanism in which an AP and/or an STA directly senses the medium, but also a virtual carrier sensing mechanism. The virtual carrier sensing mechanism is used to solve some problems such as a hidden node problem encountered with the medium access. For the virtual carrier sensing, the MAC of the WLAN system may use a Network Allocation Vector (NAV). The NAV indicates a remaining time until the medium is available, indicated to other APs and/or STAs by the AP and/or STA, each of which currently uses the medium or has authority to use the medium. Accordingly, the NAV value corresponds to a reserved time in which the medium will be used by the AP and/or STA configured to transmit the corresponding frame. An STA having received the NAV value defers medium access during the corresponding reserved time. For example, the NAV may be set according to the value of a 'duration' field of the MAC header of the frame.

A robust collision detect mechanism has been introduced to reduce the probability of collision. The robust collision detect mechanism will be described with reference to FIGS. 7 and 8. Although an actual carrier sensing range is different from a transmission range, it is assumed that the actual carrier sensing range is identical to the transmission range for convenience of description.

Figure 7:
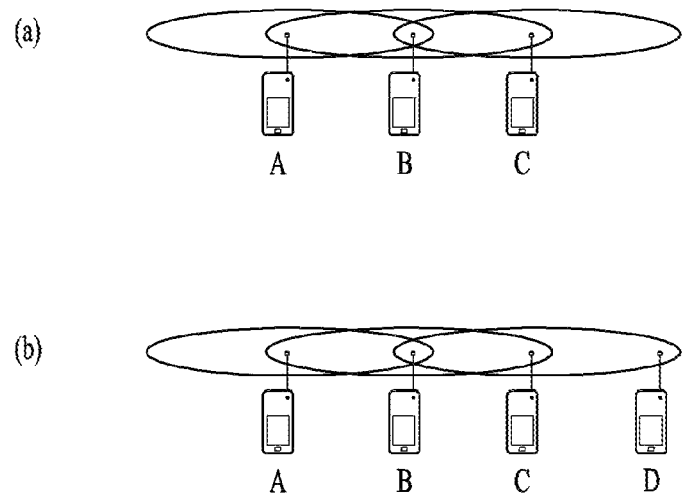
FIG. 7 is a diagram for explaining a hidden node and an exposed node.

FIG. 7 is a view referred to for describing a hidden node and an exposed node.

FIG. 7($a$) illustrates an exemplary hidden node. In FIG. 7($a$), STA A communicates with STA B, and STA C has information to be transmitted. In FIG. 7($a$), although STA A is transmitting data to STA B, STA C may determine that a medium is idle when performing carrier sensing before transmitting data to STA B. This is because transmission (i.e., medium occupation) of STA A may not be sensed at the location of STA C. In this case, since STA B simultaneously receives information from STA A and STA C, collision occurs. Here, STA A may be considered as a hidden node to STA C.

FIG. 7($b$) illustrates an exemplary exposed node. In FIG. 7($b$), while STA B transmits data to STA A, STA C has information to be transmitted to STA D. If STA C performs carrier sensing, it determines that the medium is occupied due to transmission of STA B. Therefore, although STA C has information to be transmitted to STA D, STA C senses the medium as occupied and thus should wait until the medium is idle. However, since STA A is actually located out of the transmission range of STA C, transmission from STA C may not collide with transmission from STA B from the viewpoint of STA A. Thus, STA C unnecessarily waits until STA B stops transmission. Here, STA C may be an exposed node to STA B.

Figure 8:
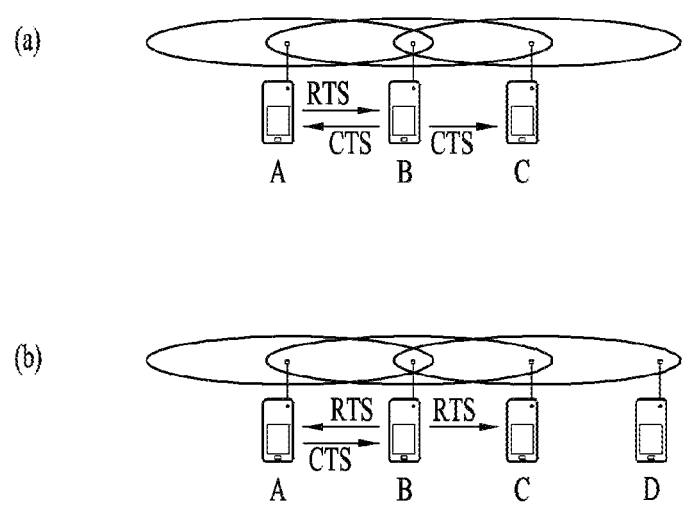
FIG. 8 is a diagram for explaining Request To Send (RTS) and Clear To Send (CTS)

FIG. 8 is a view referred to for describing Request To Send (RTS) and Clear To Send (CTS).

In order to efficiently utilize the collision avoidance mechanism in the exemplary situation of FIG. 7, a short signaling packet such as RTS and CTS may be used. RTS/CTS between two STAs may be overheard by neighboring STA(s) so that the neighboring STA(s) may consider whether information is transmitted between the two STAs. For example, if an STA that wants to transmit data transmits an RTS frame to a receiving STA, the receiving STA may indicate that it will receive data by transmitting a CTS frame to adjacent STAs.

FIG. 8($a$) illustrates an exemplary method for solving the hidden node problem. In FIG. 8($a$), it is assumed that each of STA A and STA C is ready to transmit data to STA B. If STA A transmits an RTS frame to STA B, STA B transmits a CTS frame to its adjacent STAs, STA A and STA C. As a result, STA C should wait until STA A and STA B completely transmit data, thereby avoiding collision.

FIG. 8($b$) illustrates an exemplary method for solving the exposed node problem. As STA C overhears RTS/CTS transmission between STA A and STA B, STA C may determine that no collision will occur even though it transmits data to another STA (for example, STA D). That is, STA B transmits an RTS frame to all of its adjacent STAs, and only STA A having transmission data may transmit a CTS frame. STA C receives only the RTS frame without receiving the CTS frame from STA A. Therefore, STA A may be aware that it is located outside the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
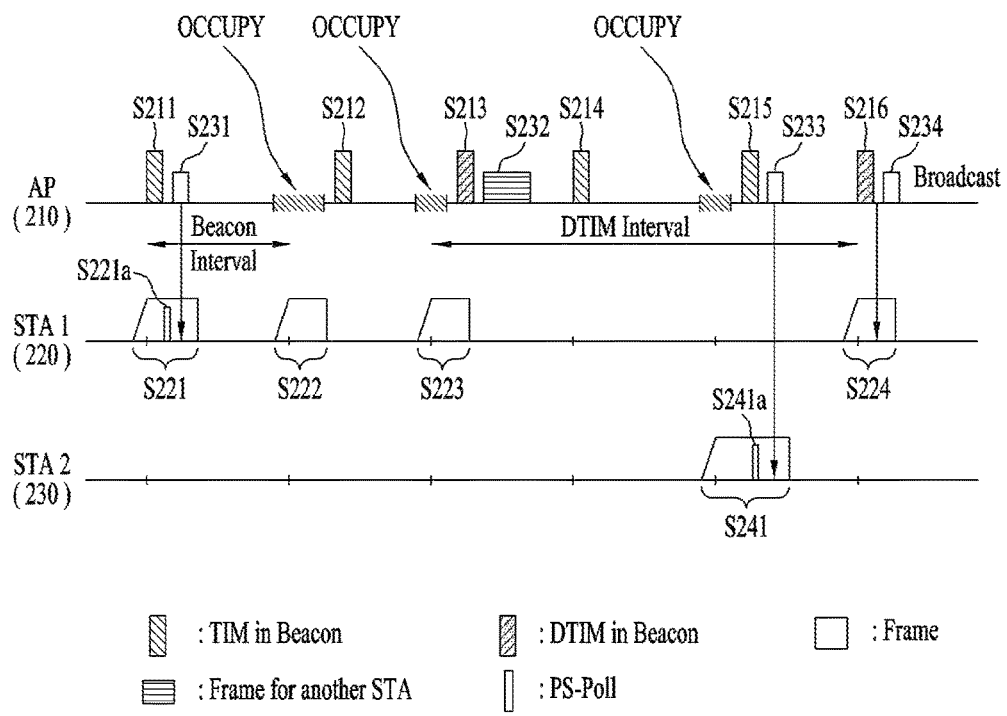
FIG. 9 is a diagram for explaining a power management operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element denoted by DTIM. During transmission of the third beacon frame, since the busy medium state is given, AP 210 may transmit the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
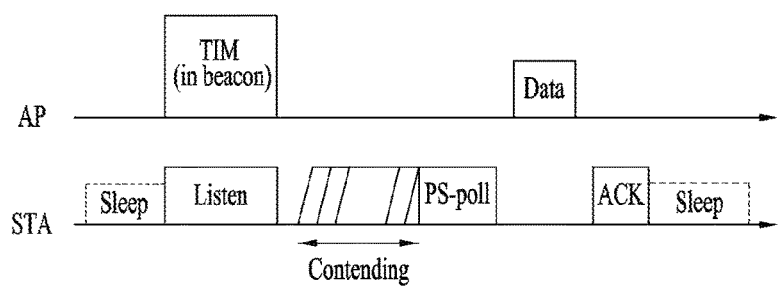
FIGS. 10 to 12 are diagrams illustrating detailed operations of a Station (STA) having received a Traffic Indication Map (TIM)
Figure 11:
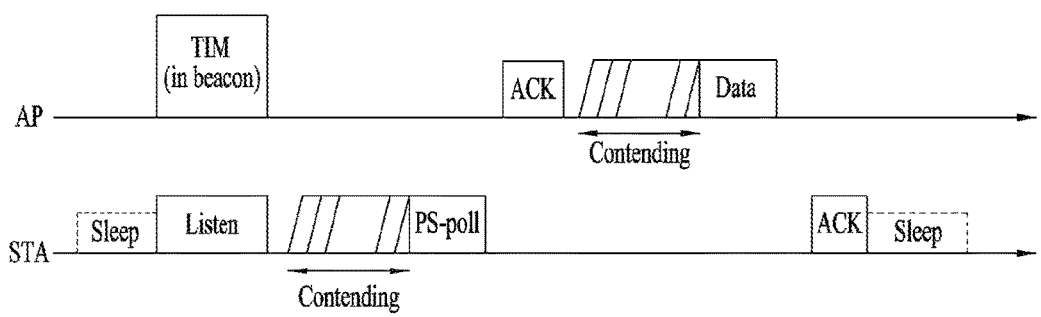
Figure 12:
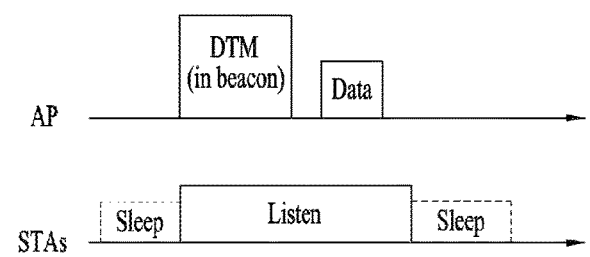

FIGS. 10 to 12 are conceptual diagrams illustrating detailed operations of a station (STA) having received a Traffic Indication Map (TIM).

Referring to FIG. 10, STA is switched from the sleep state to the awake state so as to receive the beacon frame including a TIM from the AP. The STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. The STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, a Short Inter-Frame Space (SIFS)]. In contrast, the AP having received the PS-Poll frame does not prepare a data frame to be transmitted to the STA during the SIFS time, such that the AP may operate according to the deferred response scheme, a detailed description of which will hereinafter be given with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contention. The STA may transmit the ACK frame indicating successful reception of a data frame to the AP, and may then transition to the sleep state.

FIG. 12 shows the exemplary case in which AP transmits a DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintain the awake state after reception of the beacon frame including the DTIM, the STAs may receive data, and then switch to the sleep state after completion of data reception.

TIM structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

The AID is used as a unique ID of each STA within one BSS. For example, the AID for use in the current WLAN system may be one of 1 to 2007. In the case of the current WLAN system, 14 bits for the AID may be allocated to a frame transmitted by AP and/or STA. Although the AID value may be assigned a maximum of 16383, the values of 2008 to 16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having reception (Rx) data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or a start point) value. However, although STAs each including the buffered frame are small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, and the remaining parts other than both edge parts are assigned zero (0). If STAs associated with one AP are small in number, inefficiency of bitmap compression does not cause serious problems. However, if the number of STAs associated with one AP increases, such inefficiency may deteriorate overall system throughput.

Figure 13:
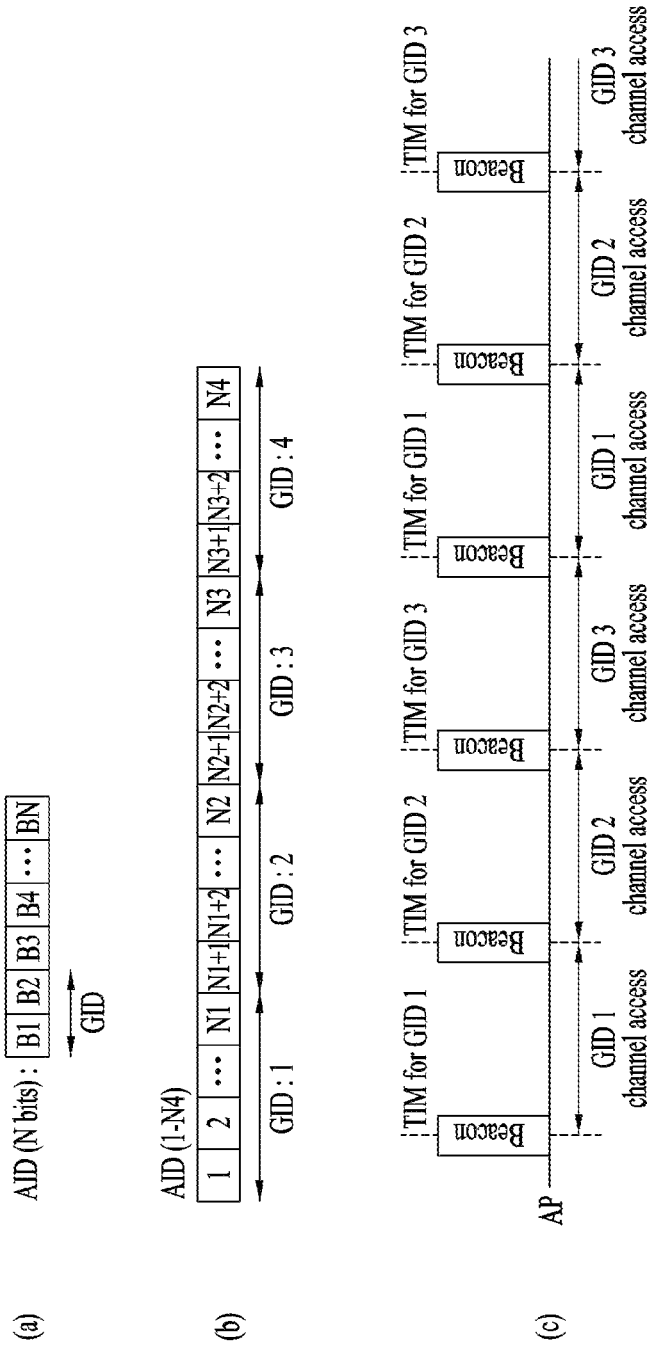
FIG. 13 is a diagram for explaining a group based AID.

In order to solve the above-mentioned problems, AIDs may be divided into a plurality of groups such that data can be more efficiently transmitted using the AIDs. A designated group ID (GID) may be allocated to each group. AIDs allocated on the basis of such group will hereinafter be described with reference to FIG. 13.

FIG. 13(a) is a conceptual diagram illustrating an example of a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. As described above, a predetermined time interval in which access to only allowed to specific STA(s) may be referred to as a restricted access window (RAW).

Channel access based on GID will hereinafter be described with reference to FIG. 13(c). The channel access mechanism according to the beacon interval when AIDs are divided into three groups is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW). A TIM element used only for AIDs having GID 3 is contained in a third beacon frame, such that channel access to an STA corresponding to the AID contained in GID 3 is allowed during a third beacon interval (or a third RAW). A TIM element used only for AIDs each having GID 1 is contained in a fourth beacon frame, such that channel access to an STA corresponding to the AID contained in GID 1 is allowed during a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or each of RAWs subsequent to the fifth beacon interval).

Although FIG. 13(c) exemplarily shows that the order of allowed GIDs is periodic or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (e.g., a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Frame Structure

Figure 14:
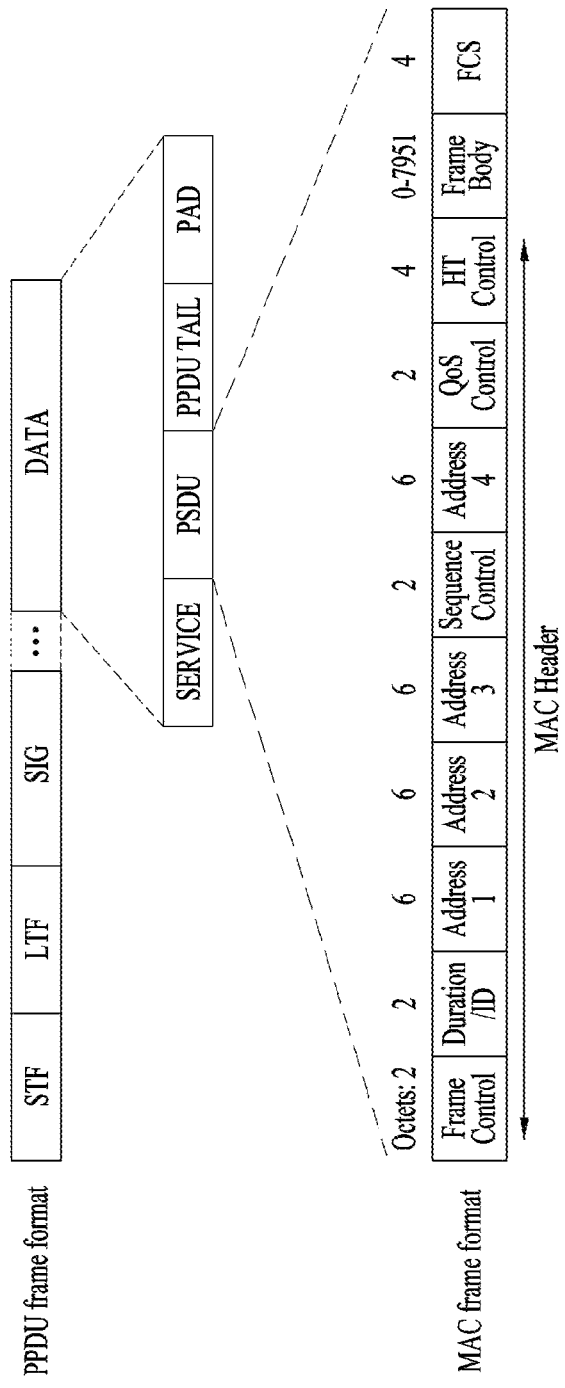
FIG. 14 is a diagram for explaining an exemplary frame format used in an 802.11 system.

FIG. 14 is a diagram for explaining an exemplary frame format used in an 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

A MAC header may include a frame control field, a Duration/ID field, an address field, etc. The frame control field may include control information requisite for frame transmission/reception. The Duration/ID field may be established as a specific time for transmitting the corresponding frame or the like. For a detailed description of Sequence Control, QoS Control, and HT Control sub-fields of the MAC header reference may be made to the IEEE 802.11-2012 standard documentation.

The frame control field of the MAC header may include Protocol Version, Type, Subtype, To DS, From DS, More Fragment, Retry, Power Management, More Data, Protected Frame, and Order sub-fields. For a detailed description of individual sub-fields of the frame control field may refer to the IEEE 802.11-2012 standard documentation.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

S1G Frame Format

In order to support applications such as M2M, Internet of Things (IoT), smart grid, etc., long-range, low-power communication is required. To this end, a communication protocol using a channel bandwidth of 1 MHz/2 MHz/4 MHz/8 MHz/16 MHz in a frequency band of 1 GHz or below (Sub 1 GHz: S1G) (e.g. 902 to 928 MHz) is under discussion.

Three types of formats are defined for an S1G PPDU: a short format used in a bandwidth of S1G 2 MHz or above, a long format used in a bandwidth of S1G 2 MHz or above, and a format used in a bandwidth of S1G 1 MHz.

Figure 15:
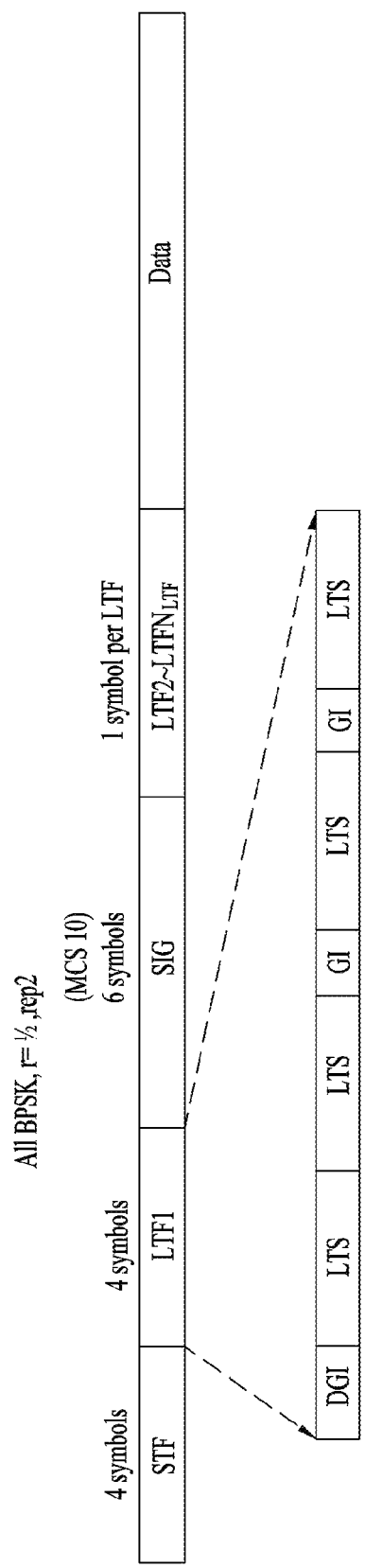
FIG. 15 is a diagram illustrating an exemplary S1G 1 MHz format.

FIG. 15 is a diagram illustrating an exemplary S1G 1 MHz format.

The S1G 1 MHz format may be used for 1 MHz PPDU Single User (SU) transmission.

Like a Green-field format defined by IEEE 802.11n, the S1G 1 MHz format illustrated in FIG. 15 includes STF, LTF1, SIG, LTF2-LTFN, and Data fields. However, the transmission time of a preamble part of the S1G 1 MHz format is increased by two or more times through repetition, compared to the Green-field format.

Although the STF field of FIG. 15 has the same periodicity as an STF (a 2-symbol length) of a PPDU in a bandwidth of 2 MHz or above, the STF field is twice repeated (rep2) in time and thus has a 4-symbol length (e.g. 160 μs). In addition, 3-dB power boosting may be applied.

The LTF1 field of FIG. 15 is designed to be orthogonal to the LTF1 field (having a 2-symbol length) of the PPDU in the bandwidth of 2 MHz or above in the frequency domain and may be repeated twice in time to have a 4-symbol length. The LTF1 field may include Double Guard Interval (DGI), Long Training Sequence (LTS), LTS, Guard Interval (GI), LTS, GI, and LTS subfields.

The SIG field of FIG. 15 may be repeatedly encoded. The lowest Modulation and Coding Scheme (MCS) (i.e., Binary Phase Shift Keying (BPSK)) and repetition coding (rep2) may be applied to the SIG field. The SIG field may be configured to have a rate of ½ and defined as a length of 6 symbols.

The LTF2 to LTFN$_{LTF}$ fields of FIG. 15 may be included in the case of MIMO. Each LTF field may be one symbol long.

Figure 16:
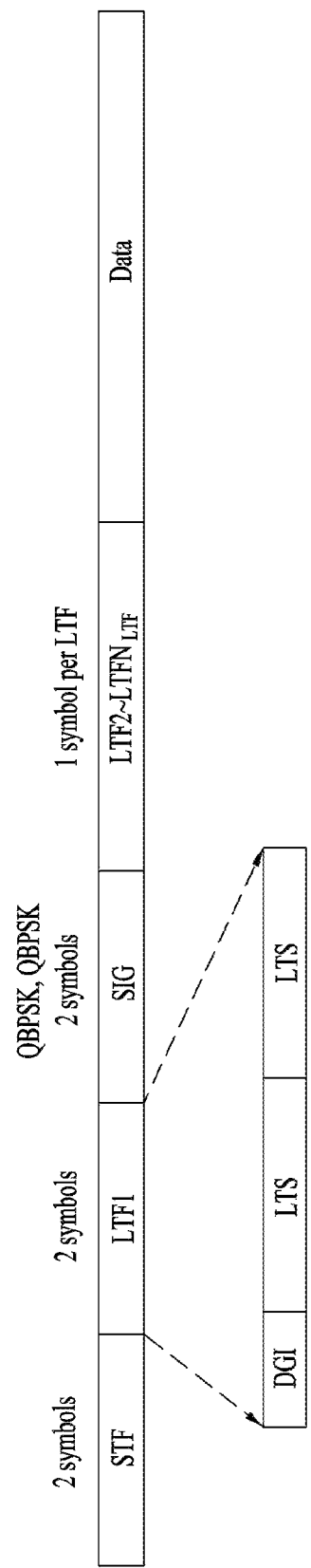
FIG. 16 is a diagram illustrating an exemplary short format of S1G greater than or equal to 2 MHz.

FIG. 16 is a diagram illustrating an exemplary short format of S1G greater than or equal to 2 MHz.

The short format of S1G greater than or equal to 2 MHz may be used for SU transmission using a PPDU of 2 MHz, 4 MHz, 8 MHz, or 16 MHz.

An STF field of FIG. 16 may have a length of 2 symbols.
An LTF1 field of FIG. 16 may have a length of 2 symbols and include DGI, LTS, and LTS.

An SIG field of FIG. 16 may be subjected to Quadrature PSK (QPSK), BPSK, etc. as an MCS.

Each of LTF2 to LTFN$_{LTF}$ fields of FIG. 16 may have a length of one symbol.

Figure 17:
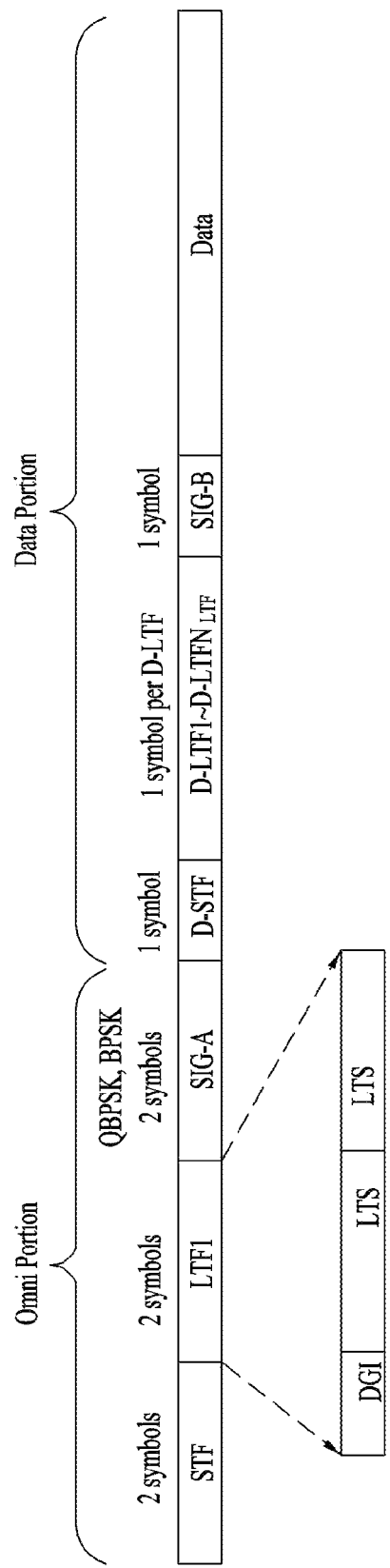
FIG. 17 is a diagram illustrating an exemplary long format of S1G greater than or equal to 2 MHz.

FIG. 17 is a diagram illustrating an exemplary long format of S1G greater than or equal to 2 MHz.

The long format of S1G greater than or equal to 2 MHz may be used for MU transmission and SU beamformed transmission using a PPDU of 2 MHz, 4 MHz, 8 MHz, or 16 MHz. The long format of S1G greater than or equal to 2 MHz may include an omni portion transmitted omnidirectionally and a data portion subjected to beamforming.

An STF field of FIG. 17 may have a length of 2 symbols.
An LTF1 field of FIG. 17 may have a length of 2 symbols and include DGI, LTS, and LTS.

An SIG-A field of FIG. 17 may be subjected to QPSK, BPSK, etc. as an MCS and have a length of 2 symbols.

A D-STF field of FIG. 17 may have a length of one symbol.

Each subfield of a D-LTF field of FIG. 17, i.e., each of D-LTF1 to D-LTFN$_{LTF}$ may have a length of one symbol.

An SIG-B field of FIG. 17 may have a length of one symbol.

Channel Access Mechanism in BSS Supporting Channel Bandwidth of 1 MHz and Channel Bandwidth of 2 MHz or Above The present invention proposes a channel access mechanism, particularly a backoff mechanism, in a BSS supporting a channel bandwidth of 1 MHz and a channel bandwidth of 2 MHz or above.

STAs belonging to a BSS perform the backoff mechanism using a primary channel. That is, the STAs may determine whether a corresponding channel (or medium) is idle by performing CCA, etc. on the primary channel. The primary channel is defined as a common channel for all members of a BSS, that is, STAs, and may be used to transmit a basic signal such as a beacon. In addition, the primary channel may be represented as a basic channel used for transmission of a data unit (e.g., a PPDU). If a channel bandwidth that an STA uses for data transmission is larger than the size of the primary channel, a channel other than the primary channel within the corresponding channel is called a secondary channel.

While a legacy WLAN system has only one channel bandwidth for the primary channel, an advanced WLAN system may have two different channel bandwidths for the primary channel according to STA capabilities. The present invention proposes a backoff mechanism in such a multi-channel environment.

For example, a sensor-type STA may support (only) 1 MHz or 2 MHz to reduce implementation complexity. However, higher throughput is required for an IoT-type or M2M-type STA. To satisfy higher throughput, the STA may support (only) 2 MHz, 4 MHz, 8 MHz, or 16 MHz.

In the present invention, STAs supporting a channel bandwidth of 1 MHz or 2 MHz are referred to as Low Rate (LR) STAs and STAs supporting a channel bandwidth of 2 MHz, 4 MHz, 8 MHz, or 16 MHz are referred to as High Rate (HR) STAs. It is assumed that a primary channel of an LR STA has a channel bandwidth of 1 MHz and a primary channel of an HR STA has a channel bandwidth of 2 MHz.

A backoff mechanism of an STA in a multi-channel environment in which primary channels have two channel bandwidths depending on capabilities of STAs according to the present invention will be described hereinbelow in detail.

An AP may indicate a primary channel to be used by an LR STA through a beacon frame. This is referred to as a first primary channel in the present invention. The AP may also indicate a primary channel to be used by an HR STA. This is referred to as a second primary channel in the present invention. For example, the first primary channel may correspond to a primary channel having a bandwidth of 1 MHz and the second primary channel may correspond to a primary channel having a bandwidth of 2 MHz.

Figure 18:
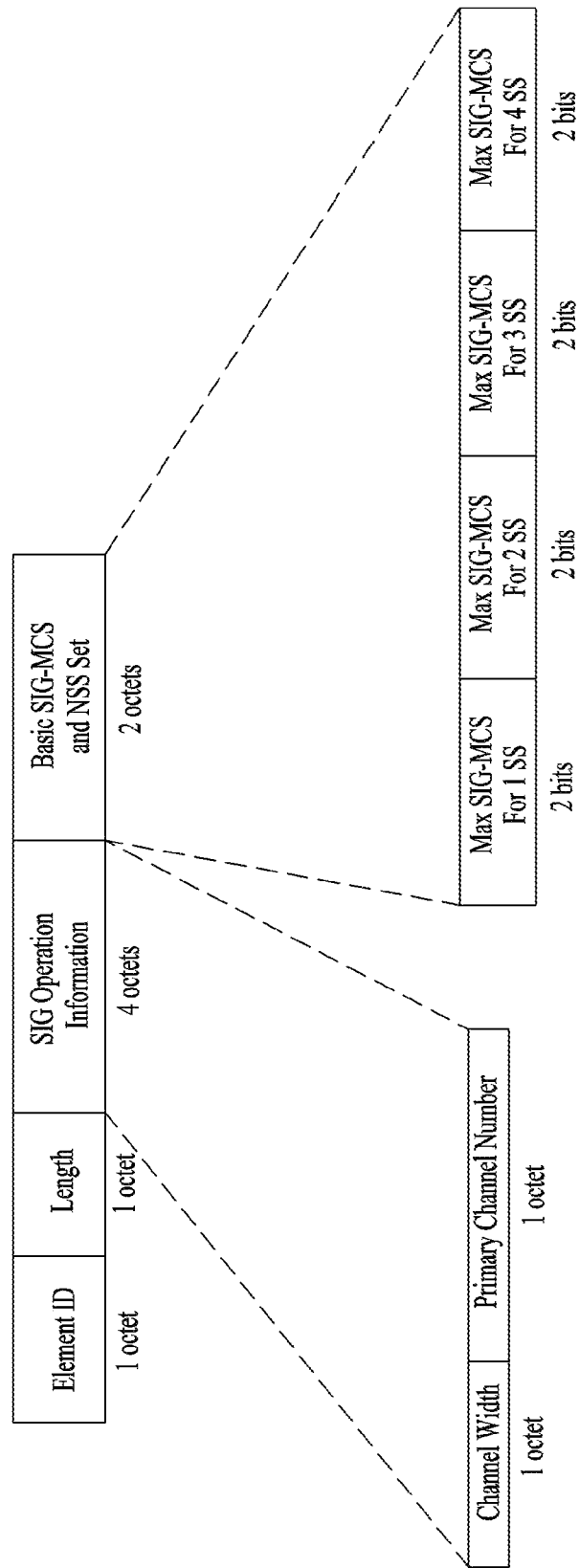
FIG. 18 is a diagram illustrating an exemplary format of an S1G operation element.

FIG. 18 is a diagram illustrating an exemplary format of an S1G operation element.

The S1G operation element of FIG. 18 may be transmitted to STAs belonging to a BSS by a beacon frame or a probe response frame. Accordingly, an S1G BSS channel set may be established.

The S1G operation element format may include an Element ID field, a Length field, an S1G Operation Information field, and a basic S1G-MCS and Number of Spatial Stream (NSS) set field.

The Element ID field of the S1G operation element may be set to a value indicating that the information element is an S1G operation element.

The Length field of the S1G operation element may be set to a value indicating the length of the following fields.

The S1G Operation Information field of the S1G operation element may include a Channel Width field and a Primary Channel Number field.

For example, bit 0 to bit 5 (B0 to B5) of the Channel Width field may be set to a value indicating one of 1, 2, 4, 8, and 16 MHz. Bits 6 and 7 (B6 and B7) of the Channel Width field may be set to a value indicating the location of a first primary channel. For example, 00 may indicate no first primary channel, 01 may indicate a lower side of a second primary channel, 10 may indicate an upper side of the second primary channel, and 11 may be reserved.

Alternatively, bit 0 to bit 5 (B0 to B5) of the Channel Width field may be configured as follows. If an S1G BSS allows 1 MHz PPDU transmission, B0 may be set to 1. If the S1G BSS allows 2 MHz PPDU transmission, B1 may be set to 1. If the S1G BSS allows 4 MHz PPDU transmission, B2 may be set to 1. If the S1G BSS allows 8 MHz PPDU transmission, B3 may be set to 1. If the S1G BSS allows 16 MHz PPDU transmission, B4 may be set to 1. B5 may indicate the location of a 1 MHz primary channel (for example, if B5 is set to 0, this indicates the lower side of a 2 MHz primary channel and, if B5 is set to 1, this indicates the upper side of the 2 MHz primary channel).

The first primary channel corresponds to a part of the second primary channel. That is, the first primary channel exists on the second primary channel. In addition, the first primary channel has a smaller channel bandwidth than the second primary channel. For example, the second primary channel (or the 2 MHz primary channel) may include the first primary channel (or the 1 MHz primary channel) and the first primary channel may be located in one of the upper 1 MHz side and lower 1 MHz side of the 2 MHz bandwidth of the second primary channel.

The Primary Channel Number field may be set to a value indicating the channel number of the second primary channel.

In this manner, the locations of the second primary channel and the first primary channel (when present) may be specified in frequency by the Channel Bandwidth field and the Primary Channel Number field included in the S1G Operation Information field.

The Basic S1G-MCS and NSS Set field of the S1G operation element may include a field of a maximum S1G-MCS for one Spatial Stream (SS) (i.e., a Max S1G-MCS For 1SS field), a Max S1G-MCS For 2SS field, a Max S1G-MCS For 3SS field, and a Max S1G-MCS For 4SS field. A Max S1G-MCS field for N SSs (N=1, 2, 3, or 4) may be set to a value indicating the index of a highest MCS supported for N SSs.

An AP may support the following three types of BSSs using the S1G operation element described with reference to FIG. 18.

First, the AP may support a BSS including only LR STAs. In this case, bits B6 and B7 of the Channel Width field in the S1G operation element may be limited to one of 01 and 10. That is, only when the location of a first primary channel to be used by an LR STA is set to one of the upper and lower sides of a second primary channel, the location of the first primary channel may be specified.

Second, the AP may support a BSS including only HR STAs. In this case, bits B6 and B7 of the Channel Width field in the S1G operation element illustrated in FIG. 18 may be limited to 00. This may imply that a first primary channel is not configured (or does not exist) for an LR STA and 1 MHz PPDU transmission is not supported by the BSS.

Third, the AP may support a BSS in which an LR STA coexists with an HR STA. In this case, bits B6 and B7 of the Channel Width field of the S1G operation element illustrated in FIG. 18 may be set to 00, 01, or 11.

In the case in which the bandwidth of a primary channel in any BSS is set to 1 MHz and/or 2 MHz as described above, a backoff procedure of an STA belonging to the BSS will be described below.

Basically, the STA performs a backoff procedure on a primary channel. Then when a backoff count (or a backoff timer value) reaches 0, the STA may determine a transmission bandwidth by checking the idle/busy state of a secondary channel at a corresponding time.

For example, if a first primary channel is not established as in a BSS including only HR STAs, the STA may invoke a backoff procedure on a second primary channel (or a 2 MHz primary channel). If a channel is idle on the second primary channel during a backoff slot, the STA decreases the backoff timer value by 1 each time. If the backoff timer value reaches 0, the STA may determine whether secondary channels are idle. That is, after the backoff timer value reaches 0, the STA may perform CCA on a 2 MHz secondary channel, a 4 MHz secondary channel, or an 8 MHz secondary channel. The STA may transmit a PPDU (e.g., a 2, 4, 8, or 16 MHz PPDU) including idle secondary channel(s) according to a CCA result of the secondary channel(s).

For example, if the first primary channel is established as in a BSS including only LR STAs, the STA may invoke a backoff procedure on the first primary channel (or a 1 MHz primary channel). If a channel is idle on the first primary channel during a backoff slot, the STA decreases the backoff timer value by 1 each time. If the backoff timer value reaches 0, the STA may determine whether secondary channels are idle. That is, after the backoff timer value reaches 0, the STA may perform CCA on a 1 MHz secondary channel, a 2 MHz secondary channel, a 4 MHz secondary channel, or an 8 MHz secondary channel. The STA may transmit a PPDU (e.g., a 1, 2, 4, 8, or 16 MHz PPDU) including idle secondary channel(s) according to a CCA result of the secondary channel(s).

Hereinafter, secondary channels will be described in detail.

An AP may indicate a secondary channel to be used by an LR STA through a beacon frame etc. In the present invention, this secondary channel will be referred to as a first secondary channel. In addition, the AP may indicate a secondary channel to be used by an HR STA. In the present invention, this secondary channel will be referred to as a second secondary channel.

The first secondary channel corresponds to a part of the second primary channel. A plurality of second secondary channels may exist and may have different channel bandwidths.

Figure 19:
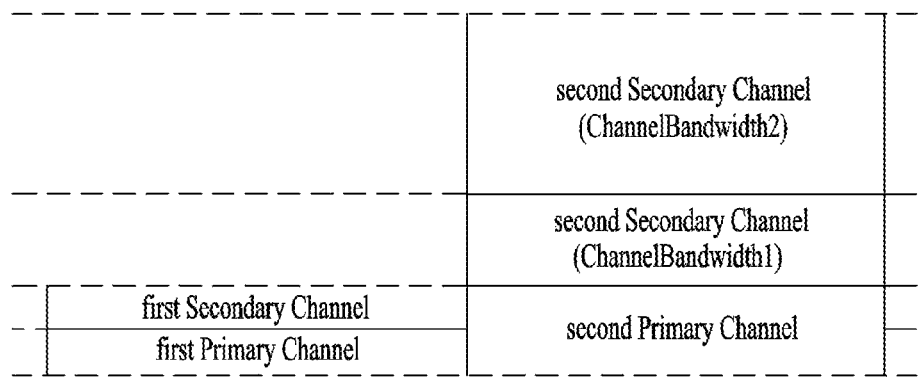
FIG. 19 is a diagram illustrating a relationship between primary channels and secondary channels.

FIG. 19 is a diagram illustrating a relationship between primary channels and secondary channels.

Each of a first primary channel and a first secondary channel corresponds to a part of a second primary channel. One or more second secondary channels may be established. If a plurality of second secondary channels is established, the second secondary channels may have different channel bandwidths (e.g., ChannelBandwidth1 and ChannelBandwidth2).

If the first primary channel and the first secondary channel are bonded to be identical to the second primary channel, the AP may indicate only a first primary channel number, a second primary channel number, and a second secondary channel number, without a first secondary channel number.

An exemplary backoff procedure in the case where primary channels and secondary channels are established as illustrated in FIG. 19 will be described below.

An LR STA may perform channel access on the first primary channel. For example, the LR STA may determine the idle/busy state of the first primary channel and invoke a backoff mechanism according to the determination. If the first primary channel is idle during a backoff slot, the STA decreases a backoff timer value by 1 and, otherwise, the STA freezes the backoff timer (i.e., the STA maintains the previous backoff count without decreasing it).

An HR STA may perform channel access on the second primary channel. For example, the HR STA may determine the idle/busy state of a channel on the second primary channel and invoke a backoff mechanism according to the determination. If the second primary channel is idle during a backoff slot, the STA decreases a backoff timer value by 1 and, otherwise, the STA freezes a backoff timer (i.e., the STA maintains the previous backoff count without decreasing it).

If the STA performs channel sensing on the second primary channel and senses that another STA uses any one of the first primary channel and the first secondary channel belonging to the second primary channel, the STA should determine that the second primary channel itself is busy.

Figure 20:
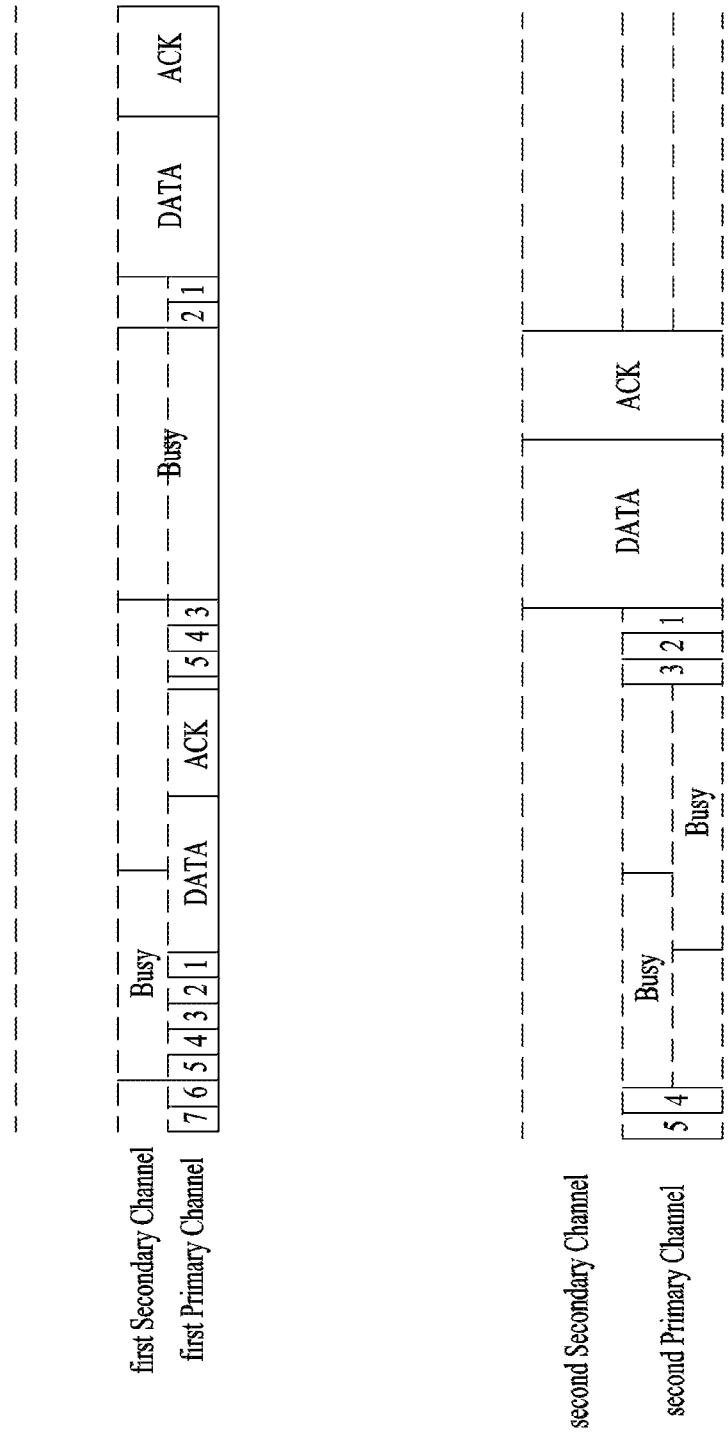
FIG. 20 is a diagram for explaining exemplary backoff procedures of STAs.

FIG. 20 is a diagram for explaining exemplary backoff procedures of STAs.

FIG. 20(a) illustrates a backoff procedure of an LR STA and FIG. 20(b) illustrates a backoff procedure of an HR STA. In the examples of FIGS. 20(a) and 20(b), it is assumed that the LR STA and the HR STA start backoff at the same time point and select 7 and 5 respectively as a backoff timer value.

Referring to FIG. 20(a), the LR STA performs channel sensing only on a first primary channel and decreases a backoff timer value from 7 to 6, 5, 4, 3, 2, and 1 by performing a backoff procedure according to the result of the channel sensing. Although the first secondary channel is busy due to communication of another BSS, the LR STA performs channel sensing on the first primary channel and thus the backoff timer value reaches 0 irrespective of use of the first secondary channel. Therefore, the STA is allowed to begin a Transmission Opportunity (TXOP) and may transmit a data frame. However, since the first secondary channel is busy when the backoff timer value reaches 0, the LR STA may not use the first secondary channel for data frame transmission and may transmit a data frame (i.e., a PPDU frame using a channel bandwidth of 1 MHz) only on the first primary channel. Then the LR STA may receive an ACK frame from the AP.

The LR STA may perform the backoff procedure again to transmit additional data. Upon selecting 5 as a random backoff timer value, the LR STA decreases the backoff timer value from 5 to 4 and 3 while a channel is idle on the first primary channel. In this case, the first primary channel is busy due to data frame transmission from an HR STA. Accordingly, the LR STA freezes countdown of the backoff timer. After the HR STA completes data frame transmission and ACK frame reception, the LR STA resumes the backoff procedure while the first primary channel is idle and decreases the backoff timer value to 2, 1, and then 0. If the backoff timer value is 0, the STA may determine that the STA is allowed to begin a TXOP and transmit a data frame. Since the first secondary channel is idle at the moment when the backoff timer value reaches 0, the LR STA may transmit a data frame (i.e., a PPDU frame using a channel bandwidth of 2 MHz) using both the first primary channel and the second secondary channel.

Referring to FIG. 20(b), the HR STA performs channel sensing on the second primary channel and decreases a backoff timer value from 5 to 4 by performing a backoff procedure according to the result of the channel sensing. If a part of the second primary channel (i.e., a part corresponding to the first secondary channel) is used by another LR STA and thus the channel is busy, the HR STA freezes countdown of the backoff timer. Even when the part of the second primary channel (i.e., the part corresponding to the first secondary channel) is idle, if another part of the second primary channel (a part corresponding to the first primary channel) is busy, the HR STA determines that the second primary channel is busy. Therefore, if no part of the second primary channel is busy (i.e., the whole second primary channel is idle), the HR STA resumes countdown of the backoff timer and thus decreases the backoff timer value to 3, 2, and 1. If the backoff timer value reaches 0, the HR STA may determine that the HR STA is allowed to begin a TXOP and transmit a data frame. Since the second secondary channel is idle, the HR STA may transmit a data frame (i.e., a 4 MHz PPDU frame) using both the second primary channel and the second secondary channel.

It is understood from the examples of FIG. 20 that the LR STA has a higher probability of gaining a TXOP than the HR STA. That is, although the LR STA and the HR STA perform a backoff procedure using the first primary channel and the second primary channel, respectively, since the probability of the whole second primary channel being idle is lower than the probability of the first primary channel being idle, the HR STA has fewer opportunities for performing a backoff countdown than the LR STA. Consequently, the HR STA has a lower probability of gaining a TXOP than the LR STA. That is, fairness in channel access between the LR STA and the HR STA is impaired.

To solve this problem, it may be considered that both the LR STA and the HR STA perform a backoff procedure only on the first primary channel. For example, it may be regulated that both the LR STA and the HR STA support only the reception capability of the first primary channel and perform a backoff mechanism only on the first primary channel.

In a BSS supporting channel bandwidths of 1 MHz, 2 MHz, 4 MHz, 8 MHz, and 16 MHz, for example, both the LR STA and the HR STA commonly support the reception capability of 1 MHz transmission and commonly perform a backoff mechanism on a 1 MHz channel. If an STA performs channel sensing only on a 1 MHz channel and performs a backoff procedure according to the channel sensing result so that the backoff timer reaches 0, the STA (irrespective of an LR STA or an HR STA) may determine that it is allowed to begin a TXOP and transmit data. Irrespective of whether the secondary channels are idle/busy during backoff countdown, transmission of a 1, 2, 4, 8, or 16 MHz PPDU frame may be determined according to the idle/busy state of the secondary channel(s), after the backoff timer value of the STA reaches 0. Additionally, the bandwidth of a data frame to be transmitted after the backoff timer value reaches 0 may be limited according to the transmission capability of the STA.

That is, both the LR STA and the HR STA perform the backoff mechanism using the first primary channel and the transmission bandwidth of data transmission is determined according to the transmission capability of an STA for which the backoff timer value reaches 0 and the idle/busy state of the first secondary channel and the second secondary channel.

However, according to such an operation scheme, even though an HR STA for which data transmission only on the first primary channel (the 1 MHz primary channel) is not supported (i.e., the HR STA should use at least the secondary primary channel (i.e., the 2 MHz primary channel) for data transmission) is allowed to begin a TXOP (or even though a backoff timer value reaches 0), the HR STA may not transmit data if all secondary channels are busy and only the first primary channel is idle.

In this case, the HR STA may perform the backoff procedure again. Unlike a new backoff procedure invoked by collision, the resumed backoff procedure may be performed while keeping a contention window at a previous value without doubling the contention window and using an unchanged retransmission count.

However, even though this scheme may offer channel access fairness between an LR STA and an HR STA, the HR STA may still have a problem of inefficiency because the HR STA is incapable of performing channel access in spite of successful backoff countdown.

Meanwhile, the problem of unfairness in channel access between an LR STA and an HR STA as illustrated in FIG. 20 may be overcome by allowing both the LR STA and the HR STA to commonly support the reception capability of the second primary channel and limiting the backoff mechanism of the LR STA and the HR STA only to the second primary channel.

In a BSS supporting channel bandwidths of 1 MHz, 2 MHz, 4 MHz, 8 MHz, and 16 MHz, for example, both an LR STA and an HR STA commonly support the reception capability of 2 MHz transmission and commonly perform the backoff mechanism on a 2 MHz channel. If as an STA performs channel sensing only on the 2 MHz channel and performs a backoff procedure according to channel sensing result so that the STA is allowed to begin a TXOP (or the backoff timer values reaches 0), the STA (irrespective of an LR STA or an HR STA) may transmit data. If the backoff timer value reaches 0, the STA may transmit a 1 MHz or 2 MHz PPDU frame according to the idle/busy states of the first primary channel, the first secondary channel, and the second primary channel. Irrespective of whether the second secondary channel is idle/busy during the backoff countdown, transmission of a 4 MHz, 8 MHz, or 16 MHz PPDU frame may be determined according to the idle/busy state of the second secondary channel after the backoff timer value reaches 0. In addition, the bandwidth of a data frame to be transmitted after the backoff timer value reaches 0 may be limited according to the transmission capability of the STA.

That is, both the LR STA and the HR STA perform the backoff mechanism using the second primary channel and the transmission bandwidth of data transmission is determined according to the transmission capability of an STA which is allowed to begin a TXOP (or for which the backoff timer value reaches 0) and the idle/busy states of the first primary channel, the first secondary channel, and the second secondary channel.

This scheme may offer channel access fairness between the LR STA and the HR STA. However, if the first primary channel is idle and the first secondary channel is busy, even the LR STA intending to transmit a 1 MHZ PPDU frame does not continue to perform the backoff countdown because the second primary channel is busy. Consequently, since the idle first primary channel is not utilized, the overall system efficiency of bandwidth use is decreased.

To solve the afore-described problems, the present invention proposes that, if an LR STA performs a backoff procedure using a first primary channel and is allowed to begin a TXOP as a result of the backoff procedure (or after a backoff timer value reaches 0), even though a second secondary channel is idle, the LR STA not be allowed to use the second secondary channel and perform data transmission only on the first primary channel.

In other words, in the case in which the first primacy channel and the first secondary channel are bonded to be identical to the second primary channel, if a backoff procedure is performed on the first primary channel and, as a result, a TXOP is allowed to begin (or after a backoff timer value reaches 0), data transmission on the second primary channel is prohibited, whereas data transmission on the first primary channel is allowed. This may be a minimum action for solving the fairness problem between the LR STA and the HR STA, compared to the case in which the HR STA performs a backoff procedure on the second primary channel to transmit data on the second primary channel.

According to this scheme, if the LR STA wants to transmit data using both the first primary channel and the first secondary channel (i.e., on the second primary channel), it may be understood that the LR STA should perform a backoff procedure on the second primary channel from the beginning, not only on the first primary channel.

Figure 21:
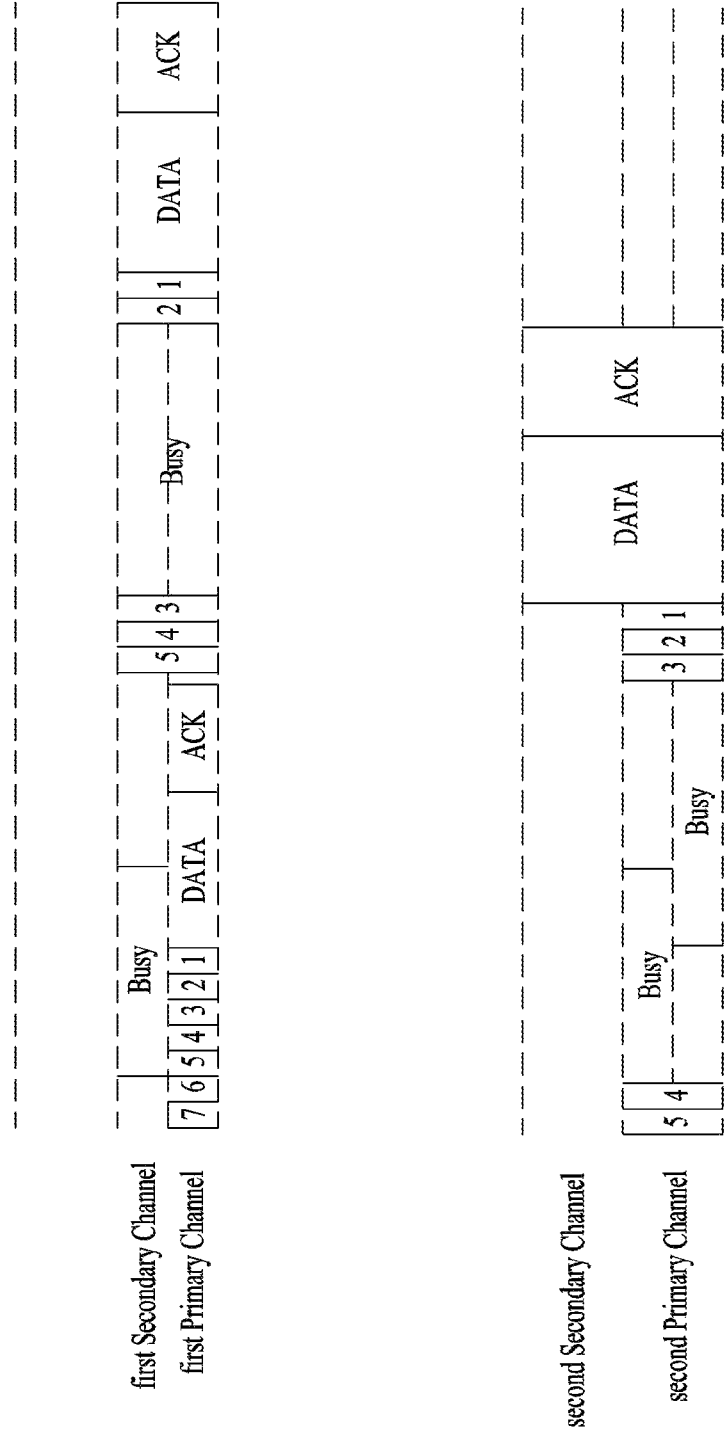
FIG. 21 is a diagram for explaining an exemplary backoff procedure of an STA according to the present invention.

FIG. 21 is a diagram for explaining an exemplary backoff procedure of an STA according to the present invention.

As illustrated in the example of FIG. 21, if an LR STA intends to transmit data (or a PPDU having a channel bandwidth of 2 MHz or above) using both the first primary channel and the first secondary channel, the LR STA may decrease a backoff timer value by 1 each time, only when both the first primary channel and the second secondary channel are idle.

If an STA has the capabilities of both an LR STA and an HR STA (e.g., an STA supports transmission in any of channel bandwidths of 1 MHz, 2 MHz, 4 MHz, 8 MHz, and 16 MHz), even though the STA is allowed to begin a TXOP by performing a backoff procedure on a 1 MHz channel (or even though the backoff timer value reaches 0), the STA may not transmit data on a 2 MHz, 4 MHz, 8 MHz, or 16 MHz channel. That is, after the STA performs the backoff mechanism on the first primary channel, the STA is prohibited from transmitting data on the second primary channel and the second secondary channel.

In summary, if the STA performs a backoff procedure on the first primary channel, only an operation for transmitting data (or a PPDU using a channel bandwidth of 1 MHz) only on the first primary channel is defined. If the STA has performed the backoff procedure on the first primary channel and the first secondary channel (i.e., the second primary channel), when a TXOP is allowed to begin (or after the backoff timer value reaches 0), the STA may transmit a data frame (or a PPDU frame using a channel bandwidth of 2 MHz) only on the second primary channel according to the channel state of the second secondary channel or may transmit a data frame (or a PPDU frame using a channel bandwidth of 4 MHz) using both the second primary channel and the second secondary channel.

While the STA is shown in the examples of FIGS. 20 and 21 as transmitting a data unit (or PPDU) having a bandwidth of up to 4 MHz, the present invention is not limited thereto. As illustrated in FIG. 19, the principle of the present invention may be applied to transmission of a PPDU having a bandwidth of up to 8 MHz or above. For example, if an STA is allowed to begin a TXOP by performing a first backoff procedure on the first primary channel (or the 1 MHz primary channel), only 1-MHz PPDU transmission is allowed (i.e., transmission of a PPDU having 2 MHz or above is not performed). If the STA is allowed to begin a TXOP by performing a second backoff procedure on the second primary channel (or the 2 MHz primary channel), the STA may transmit a 2 MHz PPDU (when only the 2 MHz second primary channel is idle), a 4 MHz PPDU (when both the 2 MHz second primary channel and the 2 MHz second secondary channel are idle), an 8 MHz PPDU (when the 2 MHz second primary channel, the 2 MHz second secondary channel, and the 4 MHz second secondary channel are idle), or a 16 MHz PPDU (when the 2 MHz second primary channel, the 2 MHz second secondary channel, the 4 MHz second secondary channel, and the 8 MHz second secondary channel are idle), according to the idle state of the secondary channels (having 2 MHz, 4 MHz, and 8 MHz) during a Point Coordination Function (PCF) Interframe Space (PIFS) immediately before the TXOP.

CCA Threshold

In the present invention, when an STA performs the backoff procedure on the first primary channel and the second primary channel, a CCA operation for determining whether a channel is idle or busy is determined mainly according to a CCA threshold (or a CCA power threshold). For example, if a received signal strength detected from a channel is equal to or larger than the CCA threshold, the channel may be determined to be busy. As a higher CCA threshold is set, other signals are less protected (that is, the probability of colliding with signals transmitted by other devices increases), whereas as a lower CCA threshold is set, other signals are more protected (that is, the probability of colliding with signals transmitted by other devices is lower).

Meanwhile, an LR STA and an HR STA have different usage scenarios. The LR STA wants to provide a long distance service with low power, whereas the HR STA seeks to achieve higher throughput than power consumption. Since the LR STA and the HR STA serve conflicting purposes, a CCA threshold which is a criterion for determining whether a channel (or a medium) is idle or busy by the LR STA and the HR STA needs to be different according to a use environment.

Therefore, the present invention proposes that two or more CCA thresholds be defined. For example, an LR CCA threshold and an HR CCA threshold may be separately defined and the HR CCA threshold may be set to be higher than the LR CCA threshold. For example, if a signal smaller than the HR CCA threshold and larger than the LR CCA threshold is detected, an STA using the HR CCA determines that the channel is not busy (i.e., idle) despite detection of the signal, whereas an STA using the LR CCA threshold determines that the channel is busy when this signal is detected. Compared to the STA using the LR CCA threshold, the STA using the HR CCA threshold may less protect signals from other devices. Accordingly, the STA using the HR CCA threshold should narrow a service range compared to the STA using the LR CCA threshold.

It is assumed in the present invention that an STA basically (as a default value) uses an HR CCA threshold. If the STA is not properly serviced due to an interference signal, the STA may transmit a management frame requesting HR CCA prohibition to an AP. Upon receipt of the management frame requesting HR CCA prohibition, the AP may broadcast the management frame commanding HR CCA prohibition to all STAs belonging to an S1G BSS. Upon receipt of the management frame commanding HR CCA prohibition, STA(s) switch from the HR CCA threshold to an LR CCA threshold.

If BSAs of different BSSs are partially or wholly overlapped and operate on the same channel, these BSSs are referred to as Overlapping BSSs (OBSSs). If an STA(s) receives the management frame commanding HR CCA prohibition from an AP of an adjacent BSS in an environment having an OBSS, the STA(s) changes its CCA threshold to the LR CCA threshold. Although the STA may use the changed LR CCA threshold, the LR CCA threshold is not continuously applied. If the AP of the adjacent BSS that has transmitted the management frame commanding HR CCA prohibition does not provide services any longer, there is no need to use the LR CCA threshold.

Accordingly, the STA(s) which have received the management frame commanding HR CCA prohibition may change from the HR CCA threshold to the LR CA threshold and apply the LR CCA threshold for a predetermined time (e.g., an HR CCA prohibit timeout). After the FIR CCA prohibit timeout, the STA returns to the HR CCA threshold. Accordingly, if the LR CCA threshold is to be continuously used, the management frame commanding HR CCA prohibition should be transmitted continuously at a smaller interval than the HR CCA prohibit timeout.

The management frame requesting HR CCA prohibition may include information indicating a time period during which HR CCA prohibition is applied (e.g., an HR CCA prohibit start time, an HR CCA Prohibit timeout, etc.). That is, if an STA is not properly serviced due to an interference signal, information about an HR CCA prohibit start time and an HR CCA prohibit timeout that define a time period may be included in the management frame requesting HR CCA prohibition in order to request HR CCA prohibition during a time period of the interference signal.

Even when the AP transmits the management frame commanding HR CCA prohibition, information indicating a time period such as an HR CCA prohibit start time and an HR CCA prohibit timeout may be included in the management frame commanding HR CCA prohibition, so that the AP may command HR CCA prohibition for a specific time period.

Upon receipt of the HR CCA prohibit management frame including the HR CCA prohibit start time and the HR CCA prohibit timeout, an STA(s) may change from the HR CCA threshold to the LR CCA threshold only for the time period defined by the HR CCA prohibit start time and the HR CCA prohibit timeout. The STA may continuously use the HR CCA threshold during an unspecified time period.

If an AP or STA that has received the management frame related to HR CCA prohibition moves to another channel, HR CCA prohibition is not applied to the channel. This means that signaling for HR CCA prohibit is performed per channel. If the AP that has received the HR CCA prohibit management frame performs channel switching, when the STA that has received the HR CCA prohibit management frame scans another channel, the previous signaling for HR CCA Prohibit is ignored and channel access may be performed using the HR CCA threshold.

S1G BSS Operation

An S1G BSS operation proposed in the present invention is as follows.

Basic S1G BSS functionality will now be described first.

An S1G STA (e.g., an S1G AP STA) generating a BSS may perform transmission and reception operations at each of <S1G-MCS, NSS> tuple values indicated by BSSBasicS1GMCS_NSSSet and perform a reception operation at each of <S1G-MCS, NSS> tuple values indicated by OperationalS1GMCS_NSSSet. In this case, BSSBasicS1GMCS_NSSSet is a parameter indicating set(s) including an MCS value and the number of spatial streams (i.e., an NSS) that are basically supported in an S1G BSS. Meanwhile, OperationalS1GMCS_NSSSet is a parameter indicating set(s) including an MCS value and an NSS that a peer STA wants to use for communication in the BSS. mBSSBasicS1GMCS_NSSSet and OperationalS1GMCS_NSSSet may be included in BSSDEscription indicating the characteristics of the BSS.

An S1G AP STA may declare channel width capability thereof in a Supported Channel Width Set subfield of an S1G Capabilities Info field of an S1G Capabilities element. For example, if the Supported Channel Width Set subfield is set to 0, this may indicate that operating channel widths of 1 MHz and 2 MHz are supported, if it is set to 1, this may indicate that operating channel widths of 1 MHz, 2 MHz, and 4 MHz are supported, if it is set to 2, this may indicate that operating channel widths of 1 MHz, 2 MHz, 4 MHz, and 8 MHz are supported, and if it is set to 3, this may indicate that operating channel widths of 1 MHz, 2 MHz, 4 MHz, 8 MHz, and 16 MHz are supported.

The S1G AP STA may set Channel Width subfield in an S1G Operation Information field of an S1G Operation element to a value indicating BSS operating channel width. An exemplary operating channel width of the S1G BSS is shown below in Table 1.

TABLE 1

| S1G Operation element Channel Width field (B0) | S1G Operation element Channel Width field (B1 B2 B3 B4) | BSS primary channel width | BSS operating channel width |
| --- | --- | --- | --- |
| 0 | b1000 | 2 MHz | 2 MHz |
| 0 | b1100 | 2 MHz | 4 MHz |
| 0 | b1110 | 2 MHz | 8 MHz |
| 0 | b1111 | 2 MHz | 16 MHz |
| 1 | b0000 | 1 MHz | 1 MHz |
| 1 | b1000 | 1 MHz | 2 MHz |
| 1 | b1100 | 1 MHz | 4 MHz |
| 1 | b1110 | 1 MHz | 8 MHz |
| 1 | b1111 | 1 MHz | 16 MHz |

In Table 1, if the zeroth bit B0, the first bit B1, the second bit B2, the third bit B3, and the fourth bit B4 of the Channel Width field are set to 0, 1, 0, 0, and 0, respectively (i.e., 01000), this indicates that a primary channel of a BSS has a width of 2 MHz and the BSS supports an operating channel having a width of 2 MHz. If B0, B1, B2, B3, and B4 of the Channel Width field are set to 01100, this indicates that the primary channel has a width of 2 MHz and the BSS supports an operating channel having a width of 4 MHz. If B0, B1, B2, B3, and B4 of the Channel Width field are set to 01110, this indicates that the primary channel has a width of 2 MHz and the BSS supports an operating channel having a width of 8 MHz. If B0, B1, B2, B3, and B4 of the Channel Width field are set to 01111, this indicates that the primary channel has a width of 2 MHz and the BSS supports an operating channel having a width of 16 MHz.

In Table 1, if B0, B1, B2, B3, and B4 of the Channel Width field are set to 10000, this indicates that the primary channel has a width of 1 MHz and the BSS supports an operating channel having a width of 1 MHz. If B0, B1, B2, B3, and B4 of the Channel Width field are set to 11000, this indicates that the primary channel has a width of 1 MHz and the BSS supports an operating channel having a width of 2 MHz. If B0, B1, B2, B3, and B4 of the Channel Width field are set to 11100, this indicates that the primary channel has a width of 1 MHz and the BSS supports an operating channel having a width of 4 MHz. If B0, B1, B2, B3, and B4 of the Channel Width field are set to 11110, this indicates that the primary channel has a width of 1 MHz and the BSS supports an operating channel having a width of 8 MHz. If B0, B1, B2, B3, and B4 of the Channel Width field are set to 11111, this indicates that the primary channel has a width of 1 MHz and the BSS supports an operating channel having a width of 16 MHz.

The S1G STA determines channelization based on a Channel Width subfield and a Primary Channel number subfield of the S1G Operation Information field An S1G STA, which is a member of an S1G BSS with an operating channel width of 1 MHz, 2 MHz, 4 MHz, 8 MHz, or 16 MHz, should not transmit a 1 MHz S1G PPDU that does not use a 1 MHz primary channel of the BSS, except for 1 MHz S1G PPDU transmission on an off-channel Tunneled Direct-Link Setup (TDLS) direct link. That is, 1 MHz S1G PPDU transmission should be performed on the 1 MHz primary channel of the BSS.

An S1G STA, which is a member of an S1G BSS with an operating channel width of 2 MHz, 4 MHz, 8 MHz, or 16 MHz, should not transmit a 2 MHz S1G PPDU that does not use a 2 MHz primary channel of the BSS, except for 2 MHz S1G PPDU transmission on an off-channel TDLS direct link. That is, 2 MHz S1G PPDU transmission should be performed on the 2 MHz primary channel of the BSS.

An S1G STA, which is a member of an S1G BSS with an operating channel width of 4 MHz, 8 MHz, or 16 MHz, should not transmit a 4 MHz S1G PPDU that does not use a 4 MHz primary channel of the BSS, except for 4 MHz S1G PPDU transmission on an off-channel TDLS direct link. That is, 4 MHz S1G PPDU transmission should be performed on the 4 MHz primary channel of the BSS.

An S1G STA, which is a member of an S1G BSS with an operating channel width of 8 MHz or 16 MHz, should not transmit an 8 MHz S1G PPDU that does not use an 8 MHz primary channel of the BSS, except for 8 MHz S1G PPDU transmission on an off-channel TDLS direct link. That is, 8 MHz S1G PPDU transmission should be performed on the 8 MHz primary channel of the BSS.

An S1G STA, which is a member of an S1G BSS with an operating channel width of 16 MHz, should not transmit a 16 MHz S1G PPDU that does not use an 8 MHz primary channel and an 8 MHz secondary channel of the BSS, except for 16 MHz S1G PPDU transmission on an off-channel TDLS direct link. That is, 16 MHz S1G PPDU transmission should be performed on the 8 MHz primary channel and the 8 MHz secondary channel of the BSS.

A first STA should not perform transmission to a second STA using a bandwidth that is not indicated as being supported by the second STA in the Supported Channel Width Set subfield in the Capabilities element from the second STA.

Next, a channel selection method of the S1G BSS will be described.

Before an S1G STA (e.g., an S1G AP STA) starts an S1G BSS, the STA may perform OBSS scan operations corresponding to a minimum of dot11S1GOBSSScanCount to search for existing BSSs (i.e., OBSSs).

If an S1G AP starts an S1G BSS with a primary channel having a width of 2 MHz that occupies some or all channels of existing BSSs, the S1G AP may select a 2 MHz primary channel of a new S1G BSS that is identical to a 2 MHz primary channel of any one of the existing BSSs.

If the S1G AP selects a 2 MHz primary channel for a new S1G BSS with an operating channel width of 4 MHz, 8 MHz, or 16 MHz from among channels on which no beacons are detected during OBSS scans, the selected 2 MHz primary channel satisfies the following conditions. The first condition is that the selected 2 MHz primary channel should not be identical to a 2 MHz secondary channel of existing BSSs with an operating channel width of 4 MHz, 8 MHz, or 16 MHz. The second condition is that the selected 2 MHz primary channel should not overlap with a 4 MHz secondary channel of existing BSSs with an operation channel width of 16 MHz.

The S1G AP STA should not start an S1G BSS with an operating channel width of 2 MHz on a channel that is a 2 MHz secondary channel of any existing BSSs with an operating channel of 4 MHz, 8 MHz, or 16 MHz or that is overlapped with a 4 MHz secondary channel of any existing BSSs with an operating channel width of 16 MHz.

In this case, the S1G AP supporting an S1G BSS with an operating channel width of 4 MHz, 8 MHz, or 16 MHz may switch to 2 MHz BSS operation and/or move to a different channel upon detecting an OBSS of which a primary channel is a 2 MHz secondary channel of the S1G AP.

If the S1G AP starts an S1G BSS with a 1 MHz primary channel width that occupies some or all channels of any existing BSSs, the S1G AP may select a 1 MHz primary channel of a new S1G BSS that is identical to a 1 MHz primary channel of any one of the existing BSSs.

If the S1G AP selects a 1 MHz primary channel for a new S1G BSS with an operating channel width of 2 MHz, 4 MHz, 8 MHz, or 16 MHz from among channels on which no beacons are detected during OBSS scans, the selected 1 MHz primary channel satisfies the following condition. That is, the selected 1 MHz primary channel should not be identical to a 1 MHz secondary channel of existing BSSs with an operating channel width of 2 MHz, 4 MHz, 8 MHz, or 16 MHz.

The S1G AP STA should not start an S1G BSS with an operating channel width of 1 MHz on a channel that is a 1 MHz secondary channel of existing BSSs with an operating channel width of 2 MHz, 4 MHz, 8 MHz, or 16 MHz.

Upon establishing a BSS supporting an operating channel width of 2 MHz, 4 MHz, 8 MHz, or 16 MHz, the S1G AP should determine and announce the location of a 1 MHz primary channel located at either an upper or lower side of a 2 MHz primary channel.

In a WLAN system, in order for an AP to start/support a BSS, the AP may scan an existing BSS or OBSS and select a primary channel for a new BSS of the AP from among channels on which no beacons are detected during OBSS scans. In this case, the primary channel of the new BSS may be selected from among channels except for a secondary channel of the OBSS.

If the new BSS supports an operating channel with a width of 4 MHz, 8 MHz, or 16 MHz, a primary channel having a width of 2 MHz for the new BSS may be selected from among channels except for the secondary channel of the OBSS. The OBSS supports an operating channel having a width of 4 MHz, 8 MHz, or 16 MHz and the secondary channel of the OBSS may be an OBSS with a channel width of 2 MHz. Alternatively, the OBSS may support an operating channel having a width of 16 MHz and the secondary channel of the OBSS may be an OBSS with a channel width of 4 MHz.

If the new BSS supports an operating channel having a width of 2 MHz, 4 MHz, 8 MHz, or 16 MHz, a primary channel having a width of 1 MHz for the new BSS may be selected from channels except for the secondary channel of the OBSS. The OBSS may support an operating channel having a width of 2 MHz, 4 MHz, 8 MHz, or 16 MHz and the secondary channel of the OBSS may be an OBSS having a channel width of 1 MHz.

Next scanning requirements of an S1G STA will be described.

An OBSS scan operation may be passively or actively performed with respect to a set of channels that are potentially affected by an S1G BSS operation. Each channel in the set may be scanned more than once during an OBSS scan operation. OBSS scans may be performed by S1G BSSs that start an S1G BSS.

During an individual scan within an OBSS scan operation, a minimum per-channel scan duration is given as Time Units (TUs) corresponding to dot11OBSSScanPassiveDwell for a passive scan and as TUs corresponding to dot11OBSSScanActiveDwell for an active scan. During the OBSS scan operation, each channel in the set is scanned at least once per dot11BSSWidthTriggerScanInterval seconds. A minimum total scan time (i.e., the sum of scan durations) per channel in one OBSS scan operation is given as TUs corresponding to dot11OBSSScanPassiveTotalPerChannel for a passive scan and as TUs corresponding to dot11OBSSScanActiveTotalPerChannel for an active scan.

The above-described parameters are minimum requirements. If combinations of the parameters are considered, minimum values of some parameters may be exceeded in order to meet the minimum value constraints of other parameters.

Next, NAV and RID assertion of an S1G BSS will be described.

A Carrier Sense (CS) mechanism is used for channel access and means an operation for determining the busy/idle state of a corresponding channel. Existing NAV assertion is a scheme in which any STA determines that a channel is being used by another STA for a predetermined time duration based on a value of a duration field of a frame received from the other STA and performs an operation according to a result (i.e. does not attempt to access a medium during the time duration). This operation may be called a Virtual CS (VCS) mechanism because the operation is considered as determining that a corresponding medium is occupied as a result of performing CS (even if the medium is idle) as compared with determination as to whether the medium is occupied by performing physical CS. Similarly to NAV assertion, a VCS time length value may be determined using an ACK indication parameter, etc. of any frame, which may be called a Response Indication Deferral (RID).

An S1G STA may update an NAV thereof using a Duration/ID field value of any frame when an RA of a frame, which is received in a 1 MHz PPDU on a 1 MHz primary channel, in a 2 MHz PPDU on a 2 MHz primary channel, in a 4 MHz PPDU on a 4 MHz primary channel, in an 8 MHz PPDU on an 8 MHz primary channel, or in an 16 MHz PPDU, does not match a MAC address of the STA.

In addition, the S1G STA may update an RID thereof using PREAMBLE TYPE, ACK_INDICATION, AGGRE- GATION, MCS, and CH_BANDWIDTH parameters of RXVECTOR of a frame received in a 1 MHz PPDU on a 1 MHz primary channel, in a 2 MHz PPDU on a 2 MHz primary channel, in a 4 MHz PPDU on a 4 MHz primary channel, in an 8 MHz PPDU on an 8 MHz primary channel, or in an 16 MHz PPDU.

In this case, a PHY layer may filter out a PPDU. If so, frames in a PPDU are not received by a MAC layer and thus have no effect on the NAV.

Next, a BSSBasicS1GMCS_NSSSet related operation will be described.

An S1G STA does not attempt to join or start a BSS unless it supports all S1G-MCSs defined in a BSSBasicS1GMCS_NSSSet parameter of related BSSDescription. Joining the BSS may be performed through a MLME-JOIN.request primitive and starting the BSS may be performed through an MLME-START.request primitive. Supporting all S1G-MCSs defined in the BSSBasicS1GMCS_NSSSet parameter of BSSDescription to which the S1G STA relates means that both transmission and reception may be performed using all the S1G-MCSs.

In addition, the S1G STA does not attempt to associate or re-associate (via an MLME-ASSOCIATE.request primitive or an MLME-REASSOCIATE.request primitive) with the S1G AP unless the S1G STA supports all the S1G-MCSs (i.e., unless the S1G-STA is able to perform both transmission and reception using all the S1G-MCSs) defined in the BSSBasicS1GMCS_NSSSet parameter transmitted by the S1G AP.

Figure 22:
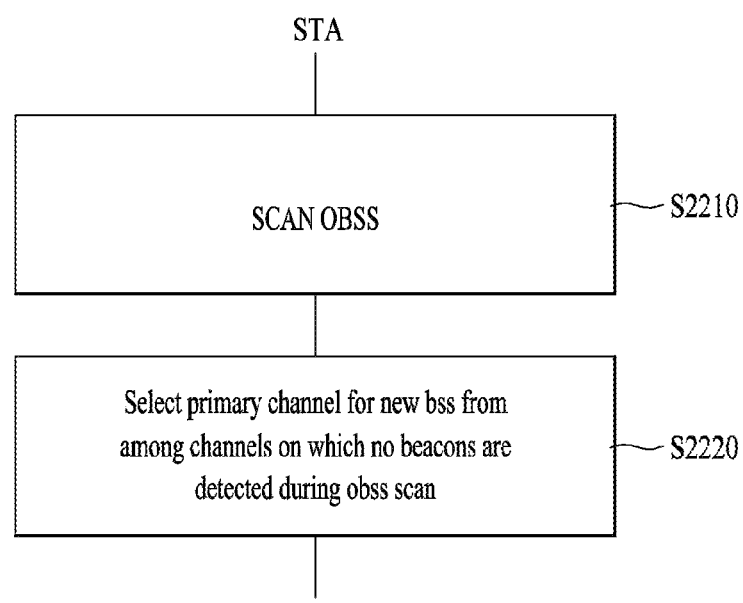
FIG. 22 is a diagram for explaining an exemplary BSS support method according to the present invention.

FIG. 22 is a diagram for explaining an exemplary BSS support method according to the present invention.

In step S2210, an STA (e.g., an AP STA) may scan an OBSS. The OBSS scan may be actively or passively performed as described above and, therefore, a repetitive description is omitted.

In step S2220, the STA may select a primary channel for a new BSS from among channels on which no beacons are detected during an OBSS scan. The primary channel may be selected from among channels except for a secondary channel of the OBSS.

While the exemplary method illustrated in FIG. 22 is represented as a series of operations for simplicity of description, this does not limit the sequence of steps. When needed, some steps may be performed at the same time or in a different order. Further, all of the steps illustrated in FIG. 22 are not necessary to implement the proposed method of the present invention.

The method of the present invention illustrated in FIG. 22 may be performed by implementing the foregoing various embodiments of the present invention independently or in combination of two or more embodiments.

Figure 23:
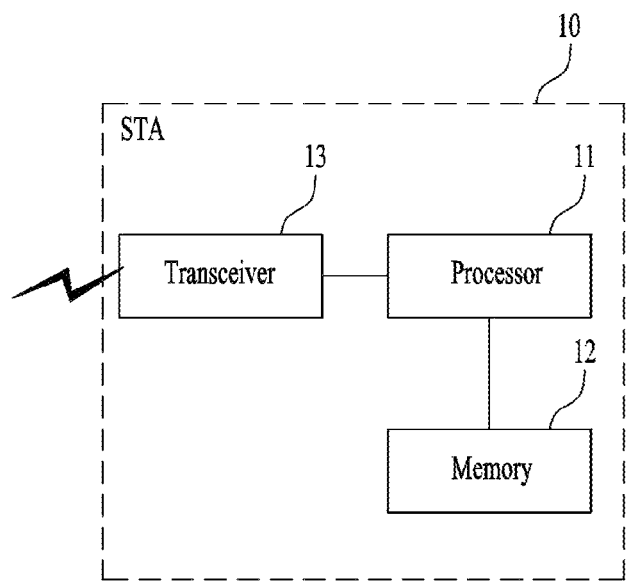
FIG. 23 is a block diagram of a wireless apparatus according to an embodiment of the present invention.

FIG. 23 is a block diagram of a wireless apparatus according to an embodiment of the present invention.

An STA 10 may include a processor 11, a memory 12, and a transceiver 13. The transceiver 13 may transmit/receive a wireless signal, for example, implement a physical layer of an IEEE 802 system. The processor 11 is connected to the transceiver 13 and implements the physical layer and/or a MAC layer of the IEEE 802 system. The processor 11 may be configured to perform operations according to the foregoing various embodiments of the present invention. Further, a module for performing operations according to the various embodiments of the present invention may be stored in the memory 12 and executed by the processor 11. The memory 12 may be included inside or outside the processor 11 and connected to the processor 11 by a known means.

The STA 10 of FIG. 23 may be an AP STA supporting a BSS. The processor 11 may be configured to scan an OBSS. In addition, the processor 11 may be configured to select a primary channel for a new BSS from among channels on which no beacons are detected during an OBSS scan. In this case, the primary channel may be selected from among channels except for a secondary channel of the OBSS.

The specific configuration of the above-described apparatus may be implemented so that the foregoing various embodiments of the present invention may be applied independently or two or more thereof may be applied simultaneously. To avoid redundancy, a repetitive description is not provided herein.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

INDUSTRIAL APPLICABILITY

While the various embodiments of the present invention have been described in the context of an IEEE 802.11 system, the present invention is also applicable to various mobile communication systems.

The invention claimed is:

1. A method for supporting a Basic Service Set (BSS) by an Access Point (AP) in a wireless local area network system, the method comprising: scanning an overlapping BSS (OBSS);

and selecting a primary channel for a new BSS of the AP from among channels on which no beacons are detected during an OBSS scan, wherein the primary channel is selected from among the channels except for a secondary channel of the OBSS, and if the new BSS supports an operating channel having a width of 4 MHz, 8 MHz, or 16 MHz, a primary channel having a width of 2 MHz for the new BSS is selected.

2. The method according to claim 1, wherein the OBSS supports the operating channel having a width of 4 MHz, 8

MHz, or 16 MHz, and the primary channel of the new BSS is selected from among the channels except for a secondary channel having a width of 2 MHz of the OBSS.

3. The method according to claim 1, wherein the OBSS supports an operating channel having a width of 16 MHz, and the primary channel of the new BSS is selected from among the channels except for a secondary channel having a width of 4 MHz of the OBSS.

4. The method according to claim 1,
wherein, if the new BSS supports an operating channel having a width of 2 MHz, 4 MHz, 8 MHz, or 16 MHz, a primary channel having a width of 1 MHz for the new BSS is selected.

5. The method according to claim 4, wherein the OBSS supports the operating channel having a width of 2 MHz, 4 MHz, 8 MHz, or 16 MHz, and the primary channel of the new BSS is selected from among the channels except for a secondary channel having a width of 1 MHz of the OHS.

6. The method according to claim 1,
wherein the AP transmits a beacon including an operation element including a channel width field.

7. The method according to claim 6,
wherein, if the zeroth bit (B0), first bit (B1), second bit (B2), third bit (B3), and fourth bit (B4) of the channel width field are set to 01000, the channel width field indicates that the primary channel has a width of 2 MHz and the new BSS supports an operating channel having a width of 2 MHz,
if B0, B1, B2, B3, and B4 of the channel width field are set to 01100, the channel width field indicates that the primary channel has a width of 2 MHz and the new BSS supports an operating channel having a width of 4 MHz,
if B0, B1, B2, B3, and B4 of the channel width field are set to 01110, the channel width field indicates that the primary channel has a width of 2 MHz and the new BSS supports an operating channel having a width of 8 MHz, and
if B0, B1, B2, B3, and B4 of the channel width field are set to 01111, the channel width field indicates that the primary channel has a width of 2 MHz and the new BSS supports an operating channel having a width of 16 MHz.

8. The method according to claim 6,
wherein, if B0, B1, B2, B3, and B4 of the channel width field are set to 10000, the channel width field indicates that the primary channel has a width of 1 MHz and the new BSS supports an operating channel having a width of 1 MHz,
if B0, B1, B2, B3, and B4 of the channel width field are set to 11000, the channel width field indicates that the primary channel has a width of 1 MHz and the new BSS supports an operating channel having a width of 2 MHz,
if B0, B1, B2, B3, and B4 of the channel width field are set to 11100, the channel width field indicates that the primary channel has a width of 1 MHz and the new BSS supports an operating channel having a width of 4 MHz,
if B0, B1, B2, B3, and B4 of the channel width field are set to 11110, the channel width field indicates that the primary channel has a width of 1 MHz and the new BSS supports an operating channel having a width of 8 MHz, and
if B0, B1, B2, B3, and B4 of the channel width field are set to 11111, the channel width field indicates that the primary channel has a width of 1 MHz and the new BSS supports an operating channel having a width of 16 MHz.

9. The method according to claim 1,
wherein the AP provides an Enhanced Distributed Channel Access (EDCA) parameter set to a station (STA) and the EDCA parameter is applied to a backoff procedure of the STA,
for transmission of a data unit having a channel width of 1 MHz, a first backoff procedure of the STA is allowed on a primary channel having a width of 1 MHz, and if a Transmission Opportunity (TXOP) is given as a result of the primary backoff procedure, only transmission of a data unit having a channel width of 1 MHz is allowed and transmission of a data unit having a channel width greater than 1 MHz is not allowed, and
for transmission of a data unit having a channel width of 2 MHz or above, a second backoff procedure of the STA is allowed on a primary channel having a width of 2 MHz, and if the TXOP is given as a result of the secondary backoff procedure, transmission of a data unit having a channel width of 2 MHz or above is allowed.

10. The method according to claim 1,
wherein the new BSS operates in a band of 1 GHz or below (sub 1 GHz).

11. An Access Point (AP) for supporting a Basic Service Set (BSS) in a wireless local area network system, the AP comprising: a transceiver; and a processor, wherein the processor is configured to scan an Overlapping BSS (OBSS) and to select a primary channel for a new BSS of the AP from among channels on which no beacons are detected during an OBSS scan, the primary channel is selected from among the channels except for a secondary channel of the OBSS, and if the new BSS supports an operating channel having a width of 4 MHz, 8 MHz, or 16 MHz, a primary channel having a width of 2 MHz for the new BSS is selected.

* * * * *